(12) United States Patent
Lee et al.

(10) Patent No.: US 8,375,410 B2
(45) Date of Patent: Feb. 12, 2013

(54) METHOD OF PROCESSING DATA ON EPG IN RECEIVER CONNECTED TO NETWORK AND THE RECEIVER

(75) Inventors: Joon Hui Lee, Yongin-si (KR); Hyeon Jae Lee, Seoul (KR); Jae Hyung Song, Seoul (KR); Gomer Thomas, Arlington, WA (US)

(73) Assignee: LG Electronics Inc., Seoul (KR)

( * ) Notice: Subject to any disclaimer, the term of this patent is extended or adjusted under 35 U.S.C. 154(b) by 479 days.

(21) Appl. No.: 12/767,236

(22) Filed: Apr. 26, 2010

(65) Prior Publication Data

US 2010/0319025 A1    Dec. 16, 2010

Related U.S. Application Data

(60) Provisional application No. 61/186,387, filed on Jun. 12, 2009, provisional application No. 61/235,360, filed on Aug. 20, 2009.

(30) Foreign Application Priority Data

Mar. 25, 2010    (KR) .......................... 10-2010-0026667

(51) Int. Cl.
  *G06F 12/00*    (2006.01)
(52) U.S. Cl. .................. 725/50; 725/39; 725/48; 725/51
(58) Field of Classification Search .................... 725/39, 725/48, 50, 51
See application file for complete search history.

(56) References Cited

U.S. PATENT DOCUMENTS

| | | | |
|---|---|---|---|
| 2007/0157282 A1 | 7/2007 | Park et al. | |
| 2008/0178248 A1* | 7/2008 | Kim et al. | 725/134 |
| 2009/0063649 A1* | 3/2009 | Yamagishi | 709/207 |

FOREIGN PATENT DOCUMENTS

| | | |
|---|---|---|
| JP | 2009-059160 | 3/2009 |
| KR | 10-2008-0048763 A | 6/2008 |
| KR | 10-2008-0063714 A | 7/2008 |
| KR | 10-2008-0065216 A | 11/2008 |
| KR | 10-2009-0059082 A | 10/2009 |
| WO | WO 2008-098500 A1 | 8/2008 |

* cited by examiner

*Primary Examiner* — Pankaj Kumar
*Assistant Examiner* — Sahar Baig
(74) *Attorney, Agent, or Firm* — McKenna Long & Aldridge LLP

(57) ABSTRACT

A digital broadcast receiver is disclosed. The receiver includes a network interface configured to receive provisioning information from a service provider during SP (Service Provider) attachment, wherein the provisioning information has both first metadata on EPG provider information giving locations where EPG data from an EPG data provider can be accessed and second metadata on EPG data locator giving a location where EPG data can be accessed in a pull mode or a push mode, the first metadata having both a target service ID element giving the identifier of a service, which is covered by each of the EPG data provider's EPG data sources, and a type of target services element giving a type of service, which is covered by each of the EPG data provider's EPG data sources, and a controller configured to perform a services discovery procedure using service discovery metadata including at least two components supplied by the service provider.

20 Claims, 40 Drawing Sheets

FIG. 13

```
<complexType name="CODCatalogServerInfoType">
<sequence>
<element name="CODCatalogServerLocator" type="cddc:EPGDataLocatorType"/>
<element name="TargetServiceProviderID" type="gt:IIFIDType" minOccurs="0"/>
</sequence>
</complexType>
<complexType name="CODServiceInfoType">
<sequence>
<element name="CODCatalogServerInfo" type="cddc:CODCatalogServerInfoType" minOccurs="0" maxOccurs="unbounded"/>
<element name="ThinClientPortal" type="anyURI" minOccurs="0"/>
<element name="CODApplicationServer" type="anyURI" minOccurs="0" maxOccurs="unbounded"/>
<element name="TFMaxiumumCODBandwidth" type="positiveInteger" minOccurs="0"/>
<element name="TFMiniumumCODStorageSpace" type="positiveInteger" minOccurs="0"/>
</sequence>
</complexType>
```

FIG. 23

```
<simpleType name="TypeOfSourceType">
        <restriction base="string">
                <enumeration value="HD"/>
                <enumeration value="SD"/>
                <enumeration value="PIP"/>
                <enumeration value="SdBarker"/>
                <enumeration value="HdBarker"/>
                <enumeration value="PipBarker"/>
                <enumeration value="CODContentHD"/>
                <enumeration value="CODContentSD"/>
                <enumeration value="CODContentLRServerLocator"/>
        </restriction>
</simpleType>
```

FIG. 30

```
<complexType name="EPGProviderInfoType">
  <sequence>
    <element name="EPGProviderName" type="mpeg7:TextualType" maxOccurs="unbounded"/>
    <element name="EPGProviderDescription" type="mpeg7:TextualType" minOccurs="0" maxOccurs="unbounded"/>
    <element name="EPGDataLocator" type="cddc:EPGDataLocatorType"/>
    <element name="TargetServiceProviderID" type="gt:IIFIDType" minOccurs="0"/>
    <element name="EPGProviderLogo" type="mps:ResourceLocatorType" minOccurs="0"/>
    <element name="SupportedServiceType" type="cddc:TypeOfSupportedServiceType" minOccurs="0" maxOccurs="unbounded"/>
  </sequence>
  <attribute name="epgProviderID" type="gt:IIFIDType" use="optional"/>
  <attribute name="version" type="unsignedInt"/>
</complexType>
```

FIG. 31

```
<simpleType name="TypeOfSupportedServiceType">
    <restriction base="string">
        <enumeration value="ALL"/>
        <enumeration value="LinearTV"/>
        <enumeration value="CODService"/>
    </restriction>
</simpleType>
```

FIG. 33

```
<complexType name="EPGDataLocatorType">
 <choice maxOccurs="unbounded">
   <element name="MulticastEPGService">
    <complexType>
     <complexContent>
       <extension base="mps:FluteSessionLocatorType">
         <attribute name="SupportedServiceType" type="cddc:TypeOfSupportedServiceType"/>
       </extension>
     </complexContent>
    </complexType>
   </element>
   <element name="UnicastEPGService">
    <complexType>
     <simpleContent>
       <extension base="anyURI">
         <attribute name="SupportedServiceType" type="cddc:TypeOfSupportedServiceType"/>
       </extension>
     </simpleContent>
    </complexType>
   </element>
 </choice>
</complexType>
```

FIG. 35

```
<complexType name="EPGProviderInfoType">
 <sequence>
  <element name="EPGProviderName" type="mpeg7:TextualType" maxOccurs="unbounded"/>
  <element name="EPGProviderDescription" type="mpeg7:TextualType" minOccurs="0" maxOccurs="unbounded"/>
  <element name="EPGDataLocator" type="cddc:EPGDataLocatorType"/>
  <element name="TargetServiceProviderID" type="gt:IIFIDType" minOccurs="0"/>
  <element name="EPGProviderLogo" type="mps:ResourceLocatorType" minOccurs="0"/>
  <element name="SupportedServiceType" type="cddc:TypeOfSupportedServiceType" minOccurs="0" maxOccurs="unbounded"/>
  <element name="TargetServiceID" type="gt:IIFIDType" minOccurs="0" maxOccurs="unbounded"/>
 </sequence>
 <attribute name="epgProviderID" type="gt:IIFIDType" use="optional"/>
 <attribute name="version" type="unsignedInt"/>
</complexType>
```

FIG. 37

```
<complexType name="EPGDataLocatorType">
  <choice maxOccurs="unbounded"/>
    <element name="MulticastEPGService">
      <complexType>
        <complexContent>
          <extension base="mps:FluteSessionLocatorType">
            <sequence>
              <element name="SupportedServiceType" type="cddc:TypeOfSupportedServiceType" minOccurs="0" maxOccurs="unbounded"/>
              <element name="TargetServiceID" type="gt:IIFIDType" minOccurs="0" maxOccurs="unbounded"/>
            </sequence>
          </extension>
        </complexContent>
      </complexType>
    </element>
    <element name="UnicastEPGService" type="cddc:UnicastEPGServiceType"/>
  </choice>
</complexType>
<complexType name="UnicastEPGServiceType">
  <sequence>
    <element name="UnicastEPGServiceLocation" type="anyURI"/>
    <element name="SupportedServiceType" type="cddc:TypeOfSupportedServiceType" minOccurs="0" maxOccurs="unbounded"/>
    <element name="TargetServiceID" type="gt:IIFIDType" minOccurs="0" maxOccurs="unbounded"/>
  </sequence>
</complexType>
```

METHOD OF PROCESSING DATA ON EPG IN RECEIVER CONNECTED TO NETWORK AND THE RECEIVER

CROSS-REFERENCE TO RELATED APPLICATIONS

Pursuant to 35 U.S.C. §119(a), this application claims the benefit of earlier filing date and right of priority to U.S. Provisional Application Nos. 61/186,387 filed on Jun. 12, 2009 and 61/235,360 filed on Aug. 20, 2009, and Korean application No. 10-2010-0026667 filed Mar. 25, 2010, the contents of which are hereby incorporated by reference herein in their entirety.

DETAILED DESCRIPTION OF THE INVENTION

1. Technical Field

The present invention relates to a method of processing EPG data and, more particularly, to a method of processing data on EPG in a service provider connected to a network and a digital broadcast receiver of processing data on EPG.

2. Background Art

The conventional TV receives contents produced by each broadcast companies (or corporations) through a radio wave propagation medium, such as groundwave (or terrestrial), cable, or satellite broadcasting. However, recently, the TVs have become capable of receiving a wider range of services by using the Internet network.

Particularly, apart from a linear TV service, with the availability of COD (Contents On Demand), a variety of services is excepted to be provided. However, according to the current technology, there lies a problem in that a protocol that can process EPG information (or data) on a large number of services at a faster rate or optionally (or selectively) process EPG information (or data) for each service has not yet been defined in detail.

DESCRIPTION OF THE INVENTION

Technical Object

According to an embodiment of the present invention, in order to substantially obviate one or more problems due to limitations and disadvantages of the related art, the present invention is devised to provide a method of processing EPG data on a large number of services at a faster rate.

Also, according to another embodiment of the present invention, the present invention is devised to provide a method of optionally (or selectively) processing EPG data for each service.

Technical Solution

To achieve these objects and other advantages and in accordance with the purpose of the invention, as embodied and broadly described herein, a control method according to an embodiment of the present invention includes transmitting provisioning information to a receiver during SP (Service Provider) attachment, wherein the provisioning information has both first metadata on EPG provider information giving locations where EPG data from an EPG data provider can be accessed and second metadata on EPG data locator giving a location where EPG data can be accessed in a pull mode or a push mode, the first metadata having both a target service ID element giving the identifier of a service, which is covered by each of the EPG data provider's EPG data sources, and a type of target services element giving a type of service, which is covered by each of the EPG data provider's EPG data sources, and transmitting service discovery metadata including at least two components to the receiver.

The control method according to another embodiment of the present invention includes receiving provisioning information from a service provider during SP (Service Provider) attachment, wherein the provisioning information has both first metadata on EPG provider information giving locations where EPG data from an EPG data provider can be accessed and second metadata on EPG data locator giving a location where EPG data can be accessed in a pull mode or a push mode, the first metadata having both a target service ID element giving the identifier of a service, which is covered by each of the EPG data provider's EPG data sources, and a type of target services element giving a type of service, which is covered by each of the EPG data provider's EPG data sources, and performing a services discovery procedure using service discovery metadata including at least two components supplied by the service provider.

Finally, a digital broadcast receiver according to an embodiment of the present invention includes network interface configured to receive provisioning information from a service provider during SP (Service Provider) attachment, wherein the provisioning information has both first metadata on EPG provider information giving locations where EPG data from an EPG data provider can be accessed and second metadata on EPG data locator giving a location where EPG data can be accessed in a pull mode or a push mode, the first metadata having both a target service ID element giving the identifier of a service, which is covered by each of the EPG data provider's EPG data sources, and a type of target services element giving a type of service, which is covered by each of the EPG data provider's EPG data sources, and a controller configured to perform a services discovery procedure using service discovery metadata including at least two components supplied by the service provider.

Advantageous Effects

According to an embodiment of the present invention, EPG data on an increasing number of services may be processed at a faster rate.

Also, according to another embodiment of the present invention, EPG data for each service may be optionally (or selectively) processed.

BRIEF DESCRIPTION OF THE DRAWINGS

Hereinafter, the characteristic features and preferred embodiments of the present invention will be described in detail with reference to the accompanying drawings.

FIG. 13 illustrates an XML Schema on another element of a Provisioning Information Type according to another embodiment of the present invention.

FIG. 23 illustrates an XML Schema on an element of a TypeOfSource type extended for a COD service according to an embodiment of the present invention . . . .

FIG. 30 illustrates a more detailed example of FIG. 29.

FIG. 31 illustrates a more detailed XML Schema on an element of a Supported Service Type shown in FIG. 29 . . . .

FIG. 33 illustrates a more detailed example of FIG. 32 . . . .

FIG. 35 illustrates a more detailed example of FIG. 34.

FIG. 37 illustrates a more detailed example of FIG. 36.

Figure 40:
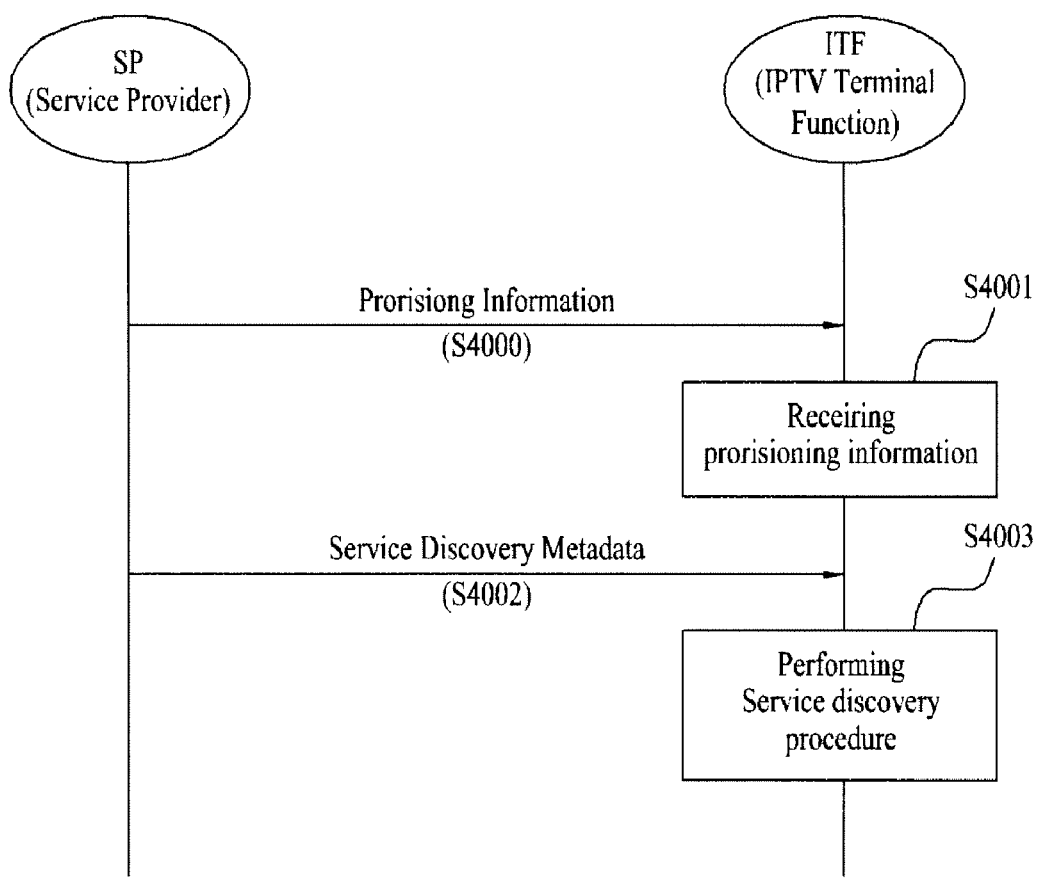

And, FIG. 40 illustrates flow chart showing a controlling method according to an embodiment of the present invention.

BEST MODE FOR CARRYING OUT THE PRESENT INVENTION

The preferred embodiments of the present invention will now be described in detail with reference to the accompanying drawings and the details given in the accompanying drawings. However, the present invention will not be limited only to the preferred embodiments described herein.

Although the terms used in the present invention are selected from generally known and used terms, some of the terms mentioned in the description of the present invention may be varied by anyone skilled in the art at his or her discretion, according to custom, or due to the advent of new technologies. Also, in some cases, some of the terms mentioned in the description of the present invention have been selected by the applicant at his or her discretion. And, in these cases, the detailed meanings are described in relevant parts of the description presented herein. Therefore, it is required that the terms used in the description of the present invention is understood not simply by the mere naming of the terms used herein but by the actual meaning of each term lying within and, also, based upon the overall content of the description of the present invention.

Figure 1:
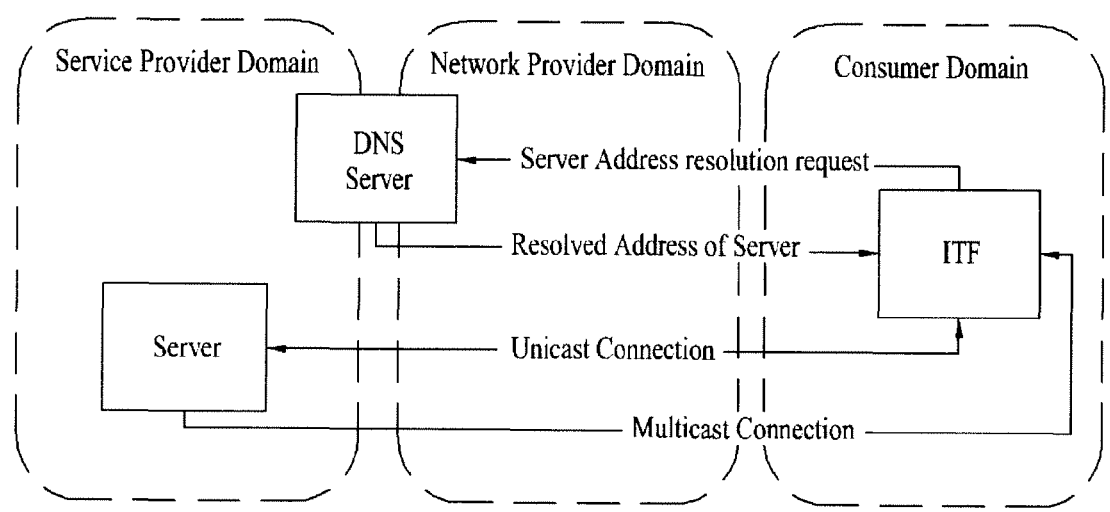
FIG. 1 illustrates a general flow of an IPTV service according to an embodiment of the present invention.

FIG. 1 illustrates a general flow of an IPTV service according to an embodiment of the present invention. Hereinafter, referring to FIG. 1, general flow of an IPTV service according to an embodiment of the present invention will now be described as follows.

In an IP network, an address for a service is defined in a URL (Uniform Resource Locator) format. Also, the address for a service may be received by making an inquiry to a DNS (Domain Name System) server . . . . Further, a Unicast or Multicast access may be performed based upon such retrieved IP address with respect to a designated protocol.

Figure 2:
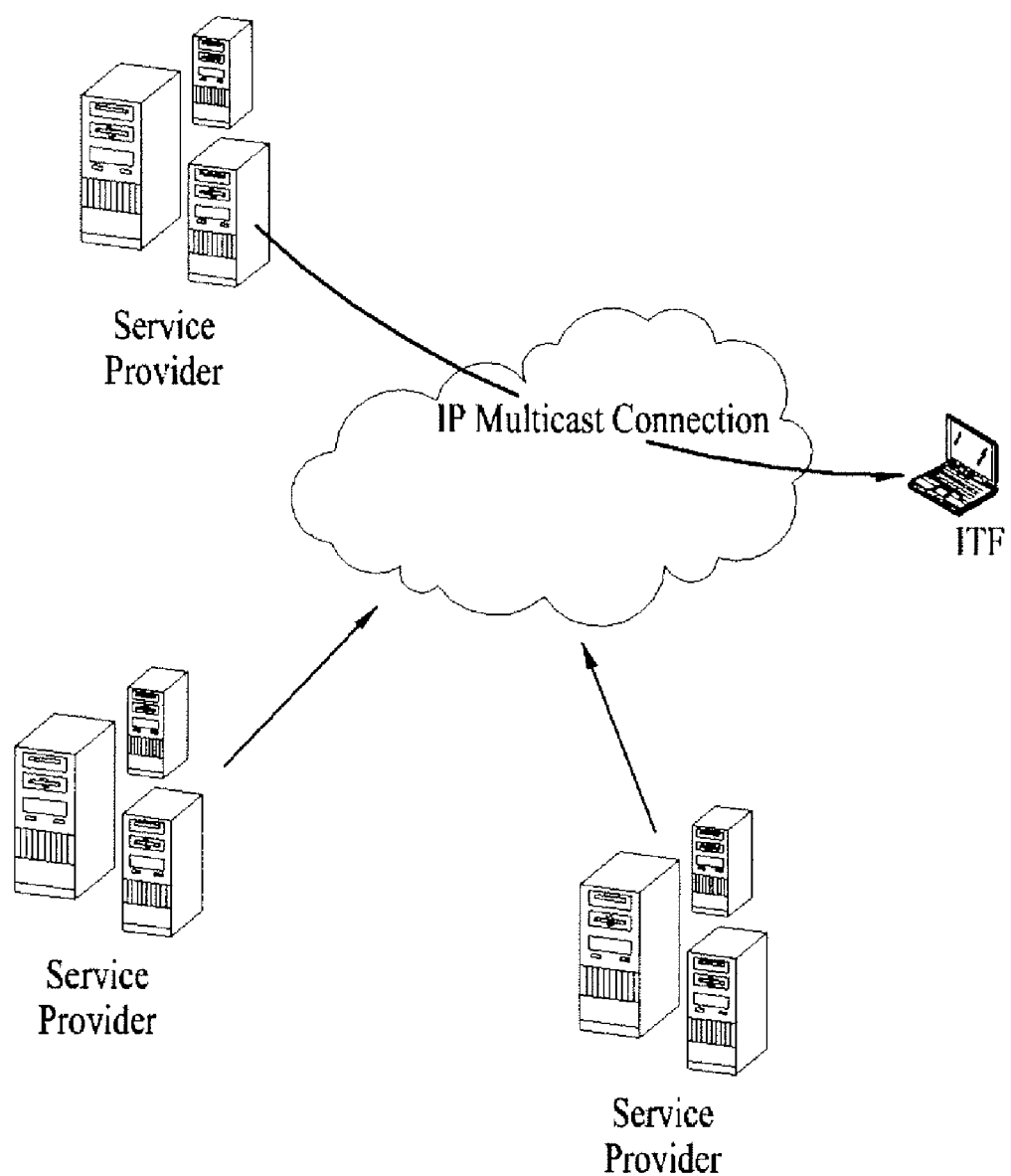
FIG. 2 illustrates an example of an IPTV service being configured in a multicast method according to an embodiment of the present invention.
Figure 3:
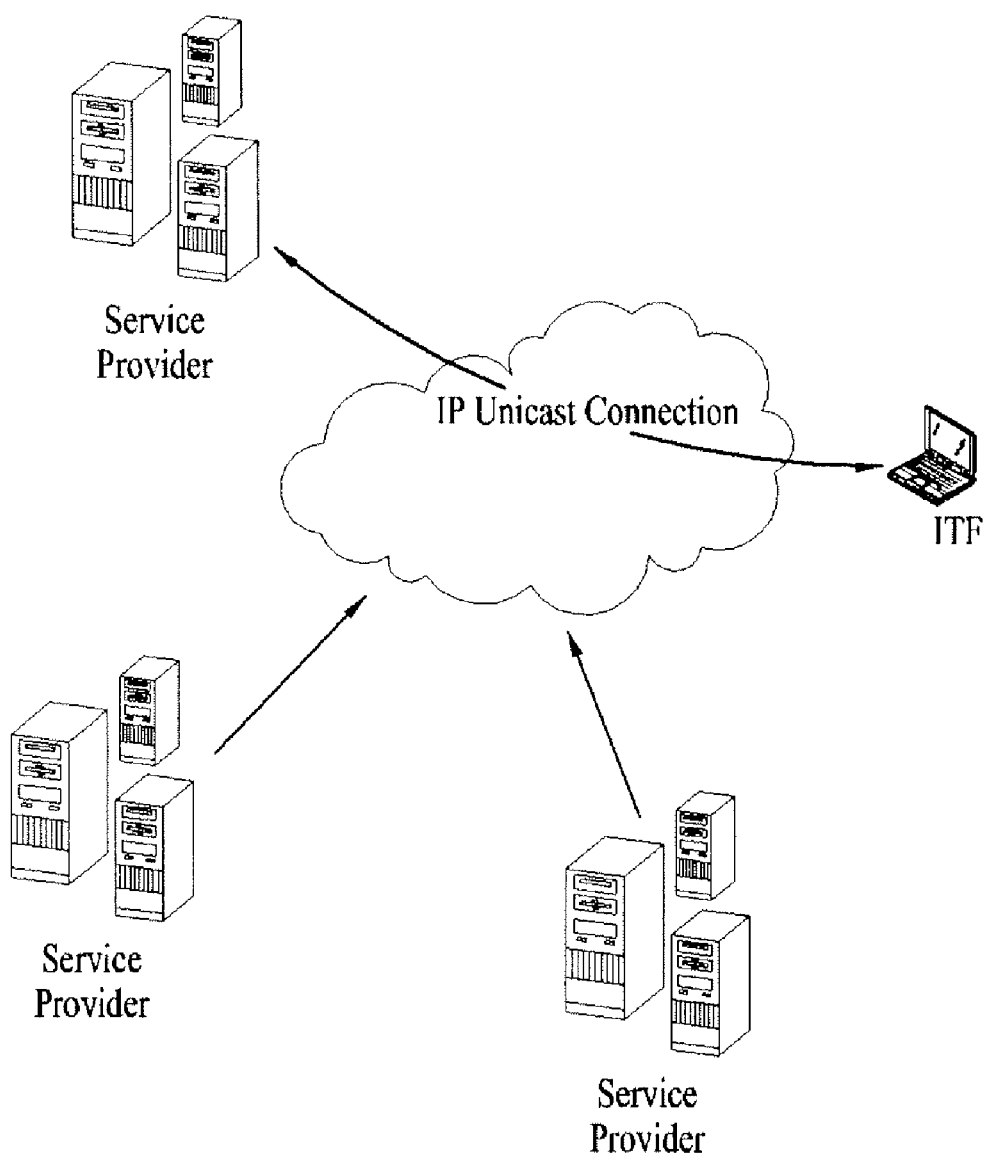
FIG. 3 illustrates an example of an IPTV service being configured in a unicast method according to an embodiment of the present invention . . . .

FIG. 2 illustrates an example of an IPTV service being configured in a multicast method according to an embodiment of the present invention. FIG. 3 illustrates an example of an IPTV service being configured in a unicast method according to an embodiment of the present invention. Hereinafter, referring to FIG. 2 and FIG. 3, the multicast and unicast methods will now be described in detail.

As shown in FIG. 2, in a multicast method, even when a plurality of receivers (e.g., ITF) participate in a single multicast STREAM, a one-to-multiple access is made, instead of a one-to-one access with a server for each receiver. Thus, an efficient data transmission may be performed.

In a unicast method, as shown in FIG. 3, a receiver (e.g., ITF) and a server attempt to perform a one-to-one access, so as to transmit and receive data.

Figure 4:
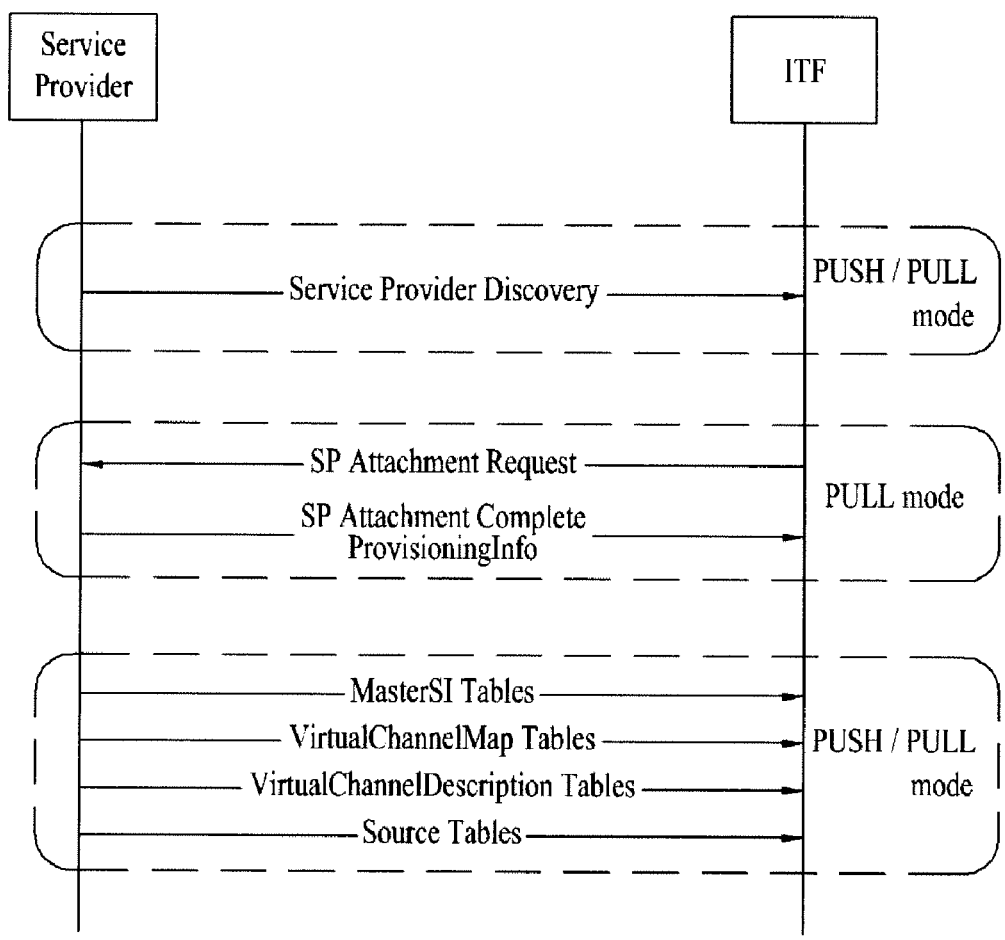
FIG. 4 illustrates a flow of an IPTV service discovery according to an embodiment of the present invention.

FIG. 4 illustrates a flow of an IPTV service discovery according to an embodiment of the present invention. Referring to FIG. 4, according to an embodiment of the present invention, the flow of an IPTV service discovery will now be described in detail.

An SP (service provider) discovery may also correspond to a process performed by service providers that provide IPTV for searching (or finding) a server that provides information on their services. Meanwhile, the SP discovery may use one of the 3 methods shown below, so as to find an address list for receiving information on a service information server, i.e., an SD (service discovery) server for each service provider (this information may also be referred to as SP discovery information) . . . .

Firstly, an address predetermined in the ITF or an address manually set-up (or determined) by the user may be used so as to retrieve the SP discovery information. Secondly, a DHCP option may be used so as to retrieve the SP discovery information. Thirdly, a DNS SRV mechanism may be used to pose (or submit) a query, thereby receiving the SP discovery information.

By accessing to a server of the address acquired by using any one of the 3 methods described above, information configured of a service provider discovery record, which carries information required in the service discovery for each SP, may be received. Further, by using the received information, a service searching step may be performed. The above-described data are available in both push/pull modes.

Also, an access may be made to an SP Attachment Server, which is designated as an SP attachment Locator of the SP discovery record, so as to perform an ITF registration procedure (Service Attachment procedure). At this point, information being delivered from the ITF to the server may be configured in an ITF Registration Input Type record format. Also, the information being delivered from the ITF to the server may be provided in a query term format of an HTTP GET method, thereby enabling service attachment to be performed.

Additionally, service attachment may also be performed after accessing an Authentication service server of an SP designated as the SP Authentication Locator and performing a separate authentication procedure . . . . In this case, an ITF information having a similar format as that of the service attachment described in the above paragraph may be transmitted to the service, thereby performing the authentication process.

Once the Service attachment procedure is successful, the data being transmitted from the server to the ITF may be configured in a Provisioning Information Table format.

The ITF includes its own ID and position (or location) information in the data (e.g., ITF Registration Input Type record, etc.) being transmitted to the server during the service attachment procedure and provides the processed data. A Service Attachment server may specify a service subscribed by the ITF based upon the above-described data. Also, the service attachment server may provide an address that can acquire the Service Information, which should be received by the ITF, in a provisioning information table format. The address may correspond, for example, to an access information of a Master SI Table. Therefore, when using the flow shown in FIG. 4, it is advantageous in that a user (or subscriber)-customized service may be provided.

Meanwhile, the Service Information, for example, includes a Master SI Table managing access information and version of a Virtual Channel Map, a Virtual Channel Map Table providing a service list in a package format, a Virtual Channel Description Table carrying detailed information on each channel, and a Source Table carrying access information enabling access to the actual service.

Figure 5:
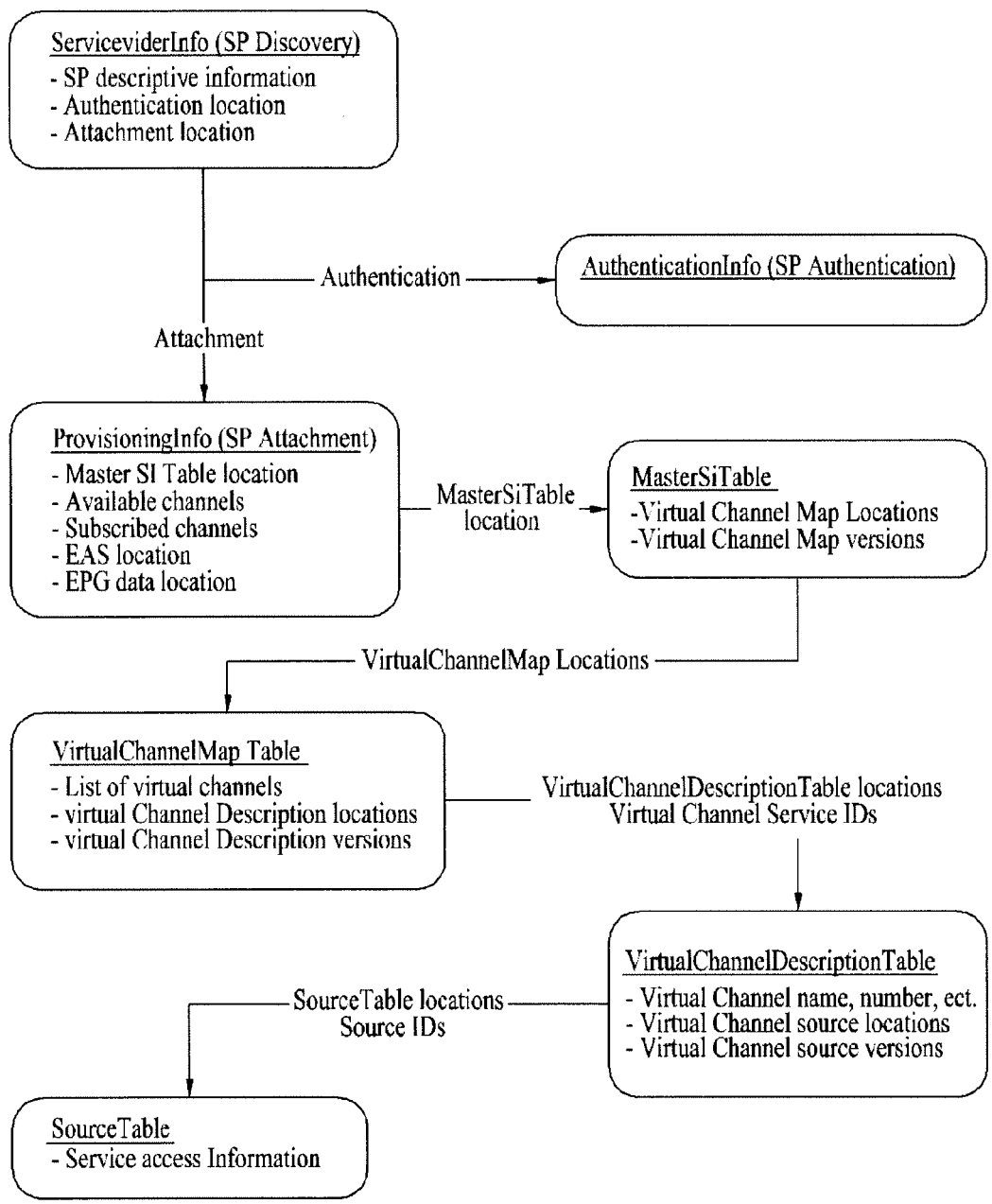
FIG. 5 illustrates a relation between each component belonging to service discovery metadata according to an embodiment of the present invention.

FIG. 5 illustrates a relation between each component belonging to service discovery metadata according to an embodiment of the present invention. Hereinafter, an SI, which is an example of service discovery metadata, will now be described in detail with reference to FIG. 5.

A Master SI Table includes information on a position (or position information) in which each virtual channel map table may be received, and version information of each virtual channel map.

Each virtual channel map is uniquely identified by a virtual channel map identifier, and the virtual channel map version carries version information of a virtual channel map. When any one of all tables connected in the direction of the arrow starting from the Master SI Table shown in FIG. 5 is modified, this may lead to an increase in a version number of the corresponding table and to an increase in the version number of all higher (or upper) level tables (up to the Master SI table). Therefore, by monitoring the Master SI table, a change in the entire SI table may be swiftly recognized . . . .

For example, when a change occurs in the Source Table, a source version, which is the version of the Source Table, is increased due to this change, and this change brings about a change in the Virtual Channel Description Table including a reference in the source table. Similarly, a change in lower level tables is propagated to the higher (or upper) level tables, thereby bringing about a final change in the Master SI table . . . .

Only one Master SI table may exist for each service provider. However, when the configuration of the service is different for each region or subscriber (or subscriber group), in order to provide a customized service for each unit, it is more efficient to generate a Master SI table for each unit. When designed as described above, in the step of service attachment, a service customized according to the region and subscription information of the subscriber may be provided by using the Master SI table.

As shown in FIG. 5, the Master SI table provides a Virtual Channel Map list, and is uniquely identified with a Virtual Channel Map Identifier. Each virtual channel map may have one or more virtual channels. And, instead of including detailed information on a channel in the virtual channel map, a location (or position) from which the detailed information can be acquired in designated. For example, a virtual channel description location performs the role of designating the location (or position) of the virtual channel description table including the channel detail information . . . .

The virtual channel description table includes detailed information of a virtual channel, and the detailed information may be discovered by a virtual channel description location of the virtual channel map. Meanwhile, 4 different methods of delivering the virtual channel description table may be considered.

Firstly, there is a method of transmitting the virtual channel description table of all channel provided by the service provider through a single global multicast stream. In this case, as described above, the virtual channel map is not required to notify the detailed information address for each virtual channel, and it is sufficient to include the address of the multicast stream in a provisioning information table.

Secondly, there is a method of providing one multicast stream for each region. The above-described first method provides channel detail information through one stream nationwide. However, the second method provides channel detail information through a separate multicast stream for each region. In this case also, since the region in which the ITF belongs may be specified through the service attachment procedure, the address of a unique multicast stream for each region may be designated through the Provisioning information table.

Thirdly, there is a method of designating a basic virtual channel description location in a virtual channel map. If detailed information of a channel belonging to a single channel map is partially or entirely retrieved from the same address, it is sufficient to designate the corresponding information only once in the virtual channel map, instead of designating the corresponding information for each virtual channel description location. However, when a channel through which detailed information is to be retrieved from a different address exists, by re-designating the address to the virtual channel description location, the basic address designated in the virtual channel map may be overridden . . . .

Fourthly, as shown in FIG. 5, there is a method of designating detailed information for each channel by using the virtual channel description location.

Meanwhile, the virtual channel service ID of the virtual channel description table is a unique identifier for identifying the corresponding service. By using the identifier, the virtual channel description table may be found (or located).

For example, when a plurality of virtual channel description tables is delivered in a multicast method, the identifier joins the corresponding stream so as to continuously receive tables, thereby finding the Virtual channel description table corresponding to the virtual channel service ID.

Meanwhile, in case of the unicast method, the virtual channel service ID is delivered to the server as a parameter, thereby receiving only the requested (or desired) virtual channel description table.

The source table provides access information required for accessing an actual service (e.g., IP address, port, A/V codec, transmission protocol, etc.), i.e., Source information. Since one source may be used for multiple virtual channel services, the structure of separately providing the source may enhance efficiency . . . .

The above-described Master SI table, Virtual channel map table, virtual channel description table, and Source table are delivered through 4 different logically separated flows, and both push/pull modes are available. However, in order to manage the version of the Master SI table, the Master SI table is transmitted via multicast, and the version change is monitored by using a stream associated with the Master SI table transmitted via multicast . . . .

Figure 6:
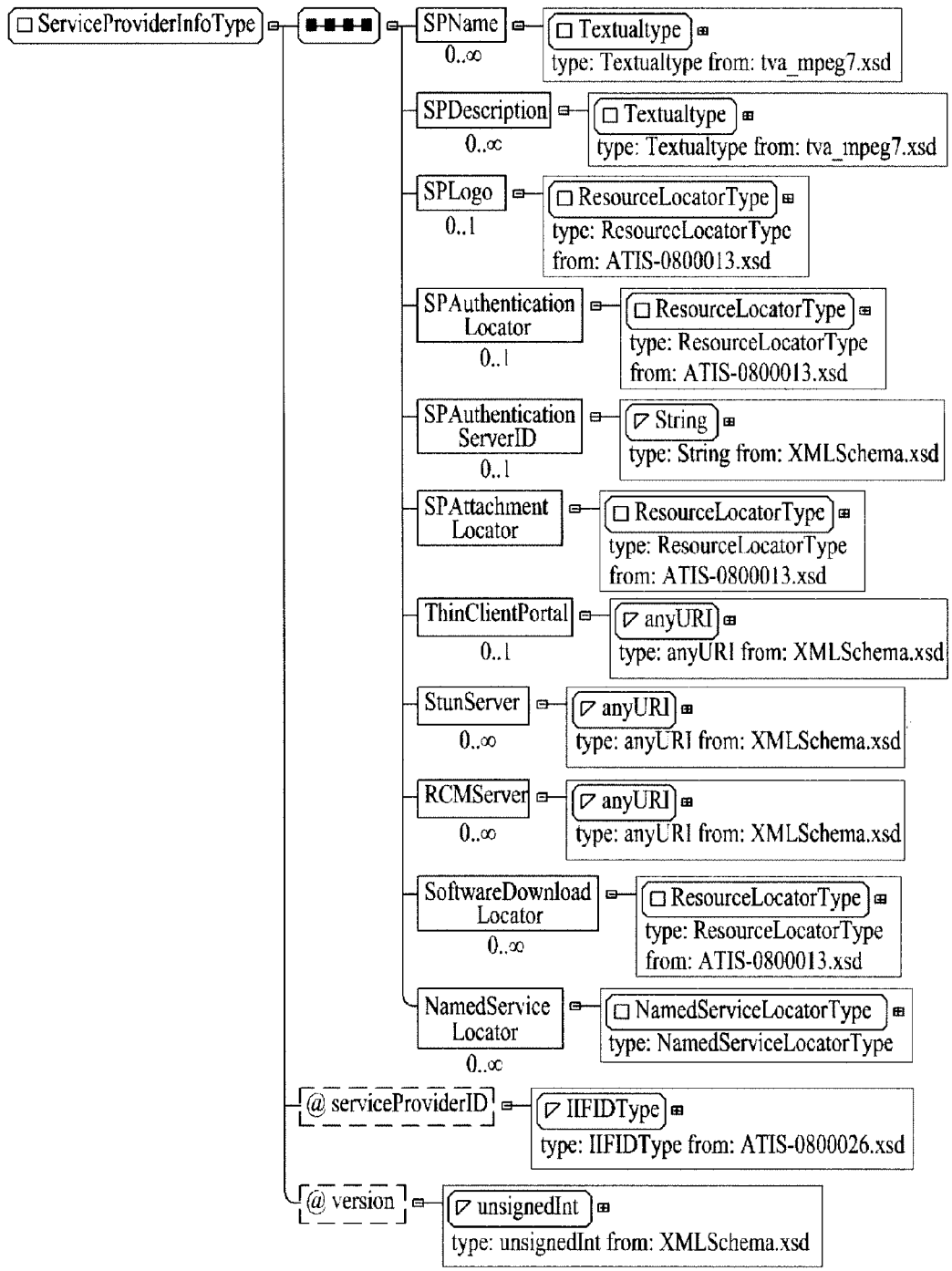
FIG. 6 illustrates an XML Schema on an element of a service provider information type according to an embodiment of the present invention.

FIG. 6 illustrates an XML Schema on an element of a service provider information type according to an embodiment of the present invention . . . . Hereinafter, the XML Schema on an element of the service provider information type according to an embodiment of the present invention will now be described in detail with reference to FIG. 6.

The information for each SP received through the above-described SP discovery procedure may be configured in a format as shown in FIG. 6.

A Service Provider ID attribute corresponds to a unique identifier that can identify the service provider, which can ensure its uniqueness by using the registered domain name.

A Version attribute indicates a version of the corresponding service provider information record.

An SP Logo attribute designates a location of a logo image of the service provider and may be used optionally (or selectively).

An SP Name element indicates the name of the service provider and may have a name corresponding to each language. More specifically, at least one or more names should be provided.

An element for SP Description corresponds to a detailed text description on the service provider. Multiple elements may exist for each language, and this element is optional.

An element for an SP Attachment Locator designates the address of a service attachment server of the service provider. The Service attachment procedure, which is absolutely necessary for starting (or initiating) a service of the corresponding SP, is performed through the service attachment server.

An element for an SP Authentication Locator designates a server address that is to be accessed when using an authentication procedure that can be optionally used. Or, alternatively, the authentication procedure may be performed prior to service attachment.

Figure 7:
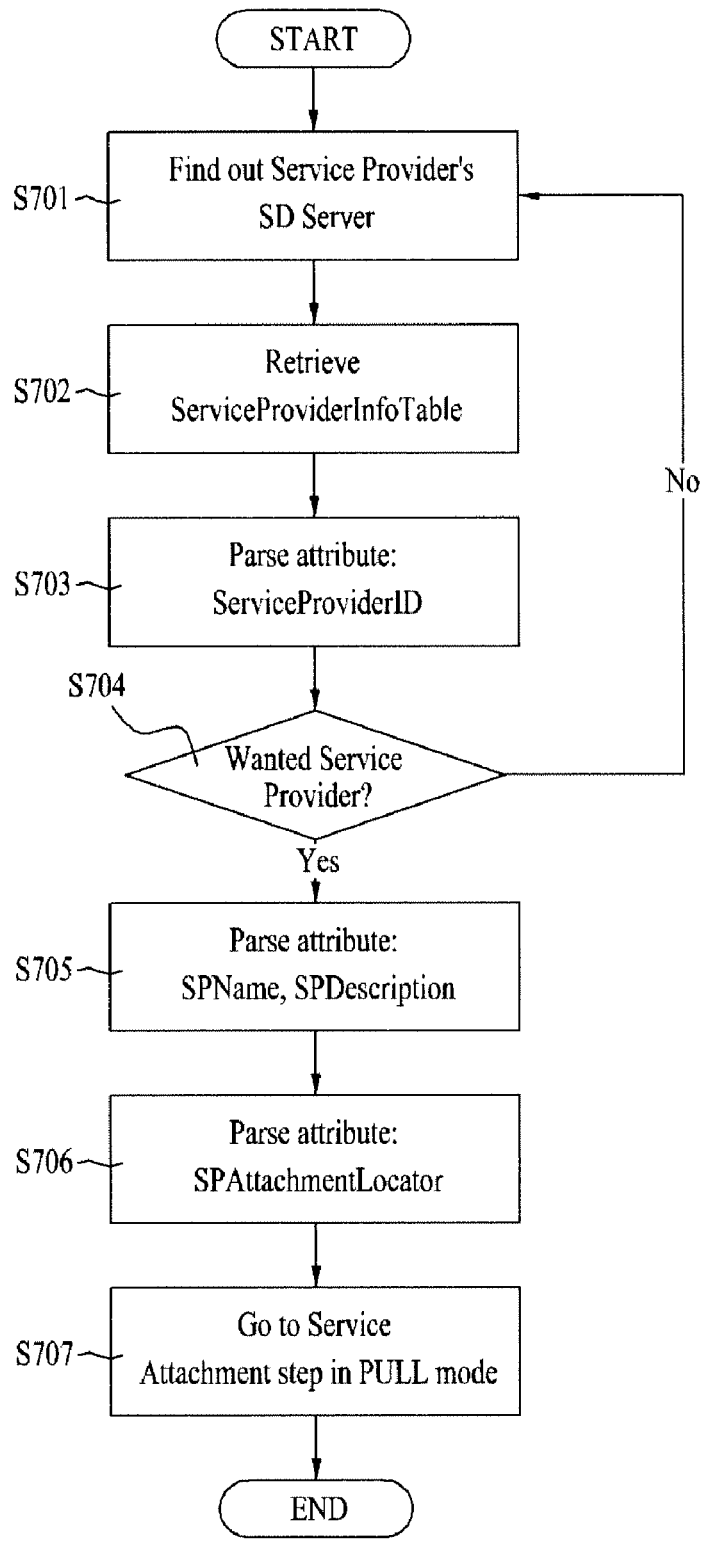
FIG. 7 illustrates an exemplary flow of a receiver performing service discovery operations according to an embodiment of the present invention.

FIG. 7 illustrates an exemplary flow of a receiver performing service discovery operations according to an embodiment of the present invention. Referring to FIG. 7, the process steps preceding service attachment will now be described.

A receiver (e.g., ITF) according to an embodiment of the present invention acquires an SD server address of a service provider based upon the above-described method of searching a Service Provider Discovery address . . . . Further, the receiver accesses each SD server, so as to retrieve an SP discovery record. A service provider ID of each record is verified so as to determine whether the service provider corresponds to the requested service provider. If it is determined by the verified result that the service provider in question corresponds to the wanted (or requested) service provider, the procedure moves on to the next step. Alternatively, if it is determined by the verified result that the service provider in question does not correspond to the wanted (or requested) service provider, the procedure shifts to another SD server. For the wanted (or requested) SP, access may be made to a designated server through the SP Attachment Locator, so that service attachment can be performed.

More specifically, referring to FIG. 7, the receiver (e.g., ITF) according to an embodiment of the present invention finds out an SD server of the service provider (S701). The receiver retrieves a service provider information table (S702). The receiver parses an attribute on a service provider ID (S703). The receiver determines whether a service provider corresponds to the wanted (or requested) service provider (S704). If the service provider corresponds to the wanted (or requested) service provider, the receiver parses attributes on an SP Name and an SP Description (S705). The receiver parses an attribute on an SP Attachment Locator (S706). The receiver is controlled to proceed to the service attachment step in Pull mode (S707).

Figure 8:
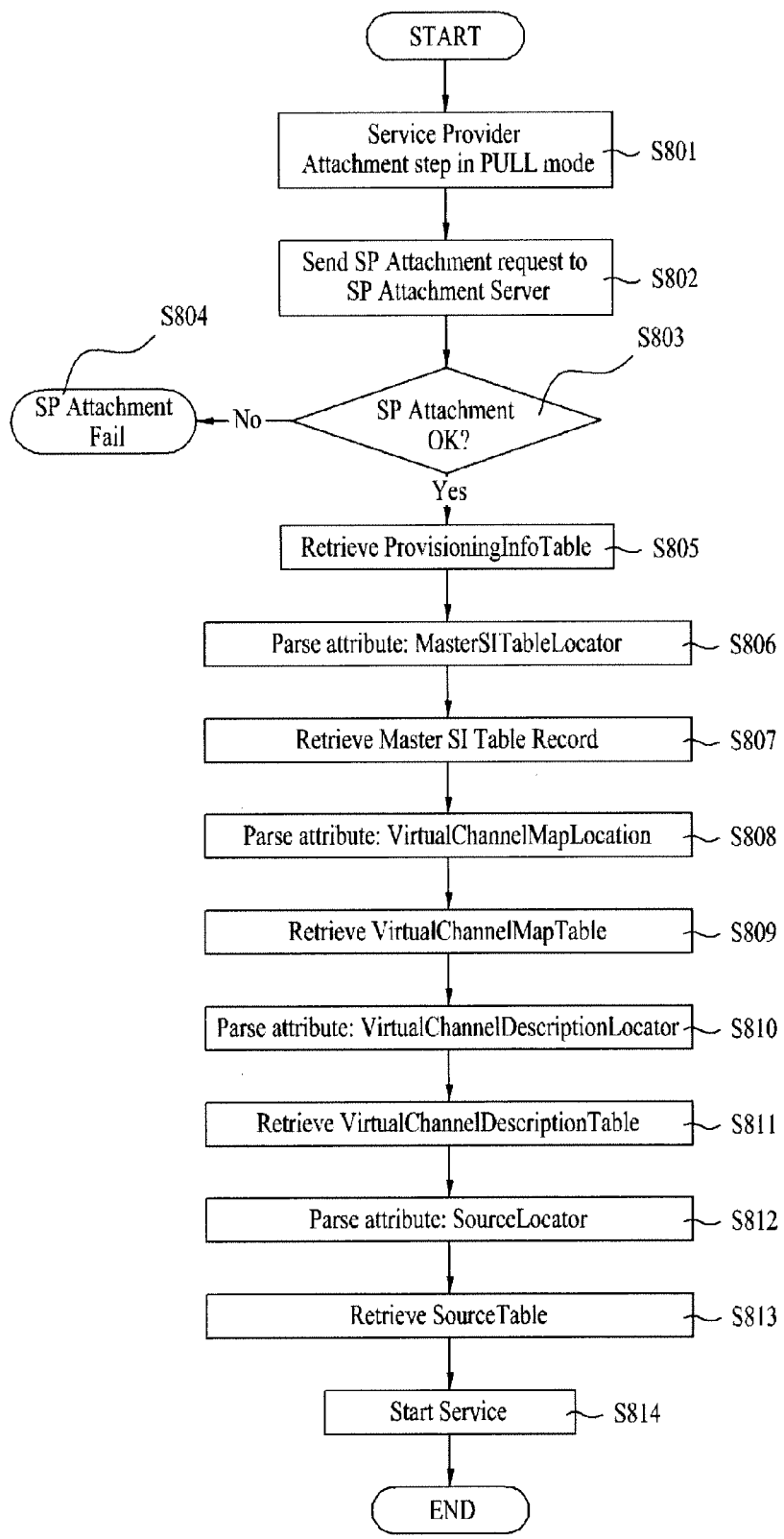
FIG. 8 illustrates another exemplary flow of a receiver performing service discovery operations according to an embodiment of the present invention.

FIG. 8 illustrates another exemplary flow of a receiver performing service discovery operations according to an embodiment of the present invention . . . . Referring to FIG. 8, the procedure of receiving SI information after SP (service provider) Attachment will now be described in detail . . . .

After the SP Attachment is successfully performed, the receiver (e.g., ITF) according to the present invention receives a Master SI table customized to the service subscriber based upon information of a provisioning information table that is being delivered. Also, starting from the reception of the master SI table, the receiving process may continue up to the reception of the source table.

More specifically, referring to FIG. 8, the receiver (e.g., ITF) according to the present invention performs a service attachment step in Pull mode (S801). The receiver sends an SP Attachment request to the SP Attachment server (S802). The receiver determines whether the SP Attachment is successful (S803). The receiver recognizes that SP Attachment is failed (S804). The receiver retrieves the provisioning information table (S805). The receiver parses an attribute on Master SI Table Locator (S806). The receiver retrieves a Master SI Table Record (S807). The receiver parses an attribute on a Virtual Channel Map Location (S808). The receiver retrieves a Virtual Channel Map Table (S809). The receiver parses an attribute on a Virtual Channel Description Locator (S810). The receiver retrieves a Virtual Channel Description Table (S811). The receiver parses an attribute on a Source Locator (S812). The receiver retrieves a Source Table (S813). The receiver starts a service (S814).

Figure 9:
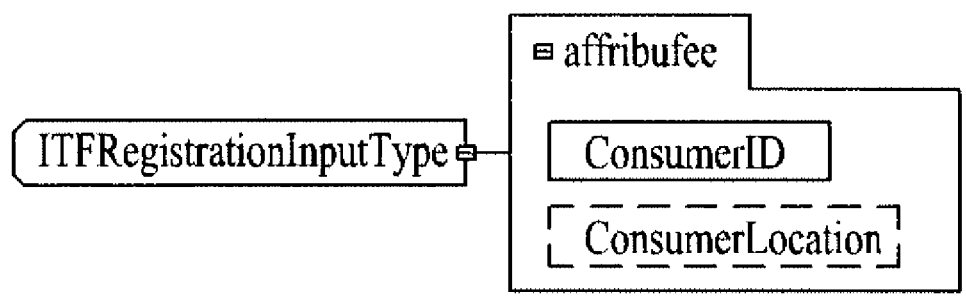
FIG. 9 illustrates an XML Schema on an element of an ITF Registration Input type according to an embodiment of the present invention.

FIG. 9 illustrates an XML Schema on an element of an ITF Registration Input type according to an embodiment of the present invention. Hereinafter, referring to FIG. 9, the XML Schema on an element of the ITF Registration Input type according to an embodiment of the present invention will now be described in detail.

The information being transmitted by the ITF to the Service attachment server for Service attachment may be configured as shown in FIG. 9.

An element for the Consumer ID corresponds to an identifier that can uniquely identify the user. Herein, an ID value assigned by the service provider may be used.

An element for the Consumer Location corresponds to information indicating the location (or position) of the user. Herein, the service attachment server uses this element to recognize the location (or position) of the user, so as to determine the corresponding region, thereby selecting an SI flow suitable for each ITF and performing transmission . . . . Meanwhile, as described above, the location (or position) information may be acquired through a DHCP option in a network attachment step.

In addition, DeviceID, deviceCertID, vendorId, modelId, serialNumber, and so on may be further included in the information being transmitted to the server for Service attachment.

A mac address of the ITF may be used as the DeviceID∈ITF. The deviceCertID may correspond to an identifier that is included to be used for security certification (or authentication) of the ITF. As an identifier that can uniquely identify a user equipment provider (or vendor), a URL may be used as the vendorId. The modelId correspond to an identifier that can identify the model of a user equipment by using a stream designated by the vendor. Finally, the serialNumber corresponds to a unique identification number designated by the vendor.

Figure 10:
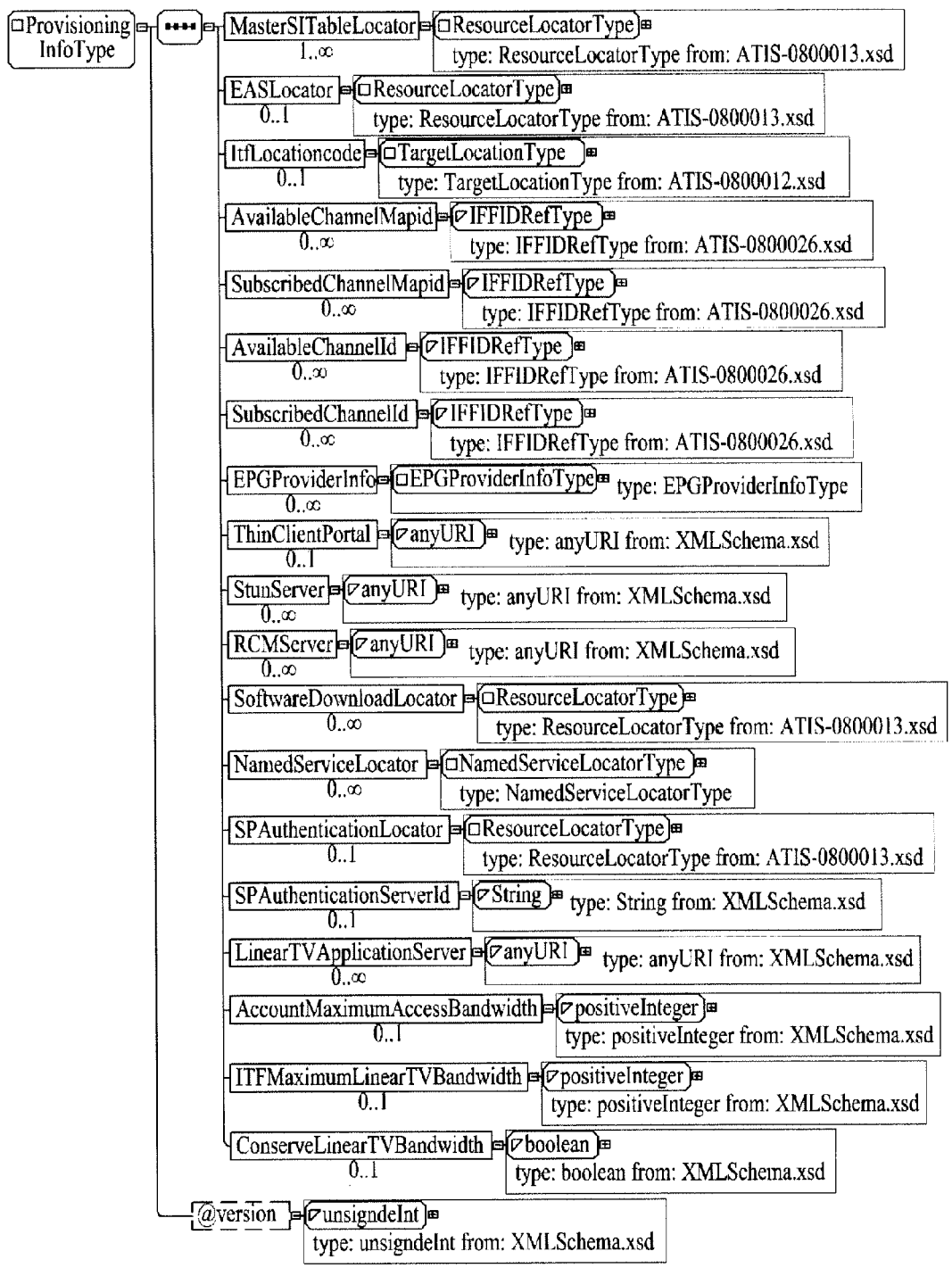
FIG. 10 illustrates an XML Schema on an element of a provisioning information type according to an embodiment of the present invention.

FIG. 10 illustrates an XML Schema on an element of a provisioning information type according to an embodiment of the present invention. Hereinafter, referring to FIG. 10, the XML Schema on an element of the provisioning information type according to an embodiment of the present invention will now be described in detail . . . . When Service attachment is successfully performed, the information being transmitted to the ITF from the service attachment server is configured as shown in FIG. 10.

An element of the Master SI Table Locator designates the location (or position) of the Master SI Table.

An element of the Subscribed Channel Map provides channel maps to which the user has subscribed. The service providers provide the channels that they are servicing (or providing) in multiple channel map formats, thereby enabling the user to select at least one channel map and to subscribe thereto. It is also possible to internally configure the channel map format, so that the user cannot directly see the channel map, thereby providing a list of channels to which the user has subscribed by combining the channel maps.

An element of the Unsubscribed Channel Map Id corresponds to a series of channel maps unsubscribed by the user. Although the user is currently unable to view the unsubscribed channels, it may be necessary to provide such channel list for promotion purposes. The service providers may optionally provide such channel maps . . . .

An element of the EPG Provider Infor provides information of an EPG provider providing EPG data. This element includes an address that can receive the EPG. The EPG may be optionally provided, and at least one or more EPGs may also be provided.

An element of the RCM Server provides an address of a Remote Configuration Server, which is provided by the SP. When this address exists, the ITF accesses the Remote Configuration Server, so as to perform a Remote Configuration procedure.

Further, the schema shown in FIG. 10 includes provisioning information of the current service provider, and such information may be broadly categorized into information associated with a service provided by the SP (e.g., location (or position) of the Master SI Table, a list of user equipment support services, a list of the entire services, and a Thin client portal URI, etc.), information required for managing the user equipment (e.g., STUN Information, remote control server address, address for software download, certification service address, user equipment position (or location) information, etc.). Particularly, in the present invention, a protocol is to be newly defined so that, in addition to linear TV services, COD (content on demand) services can also be applied. Hereinafter, a more detailed description will be provided.

Figure 11:
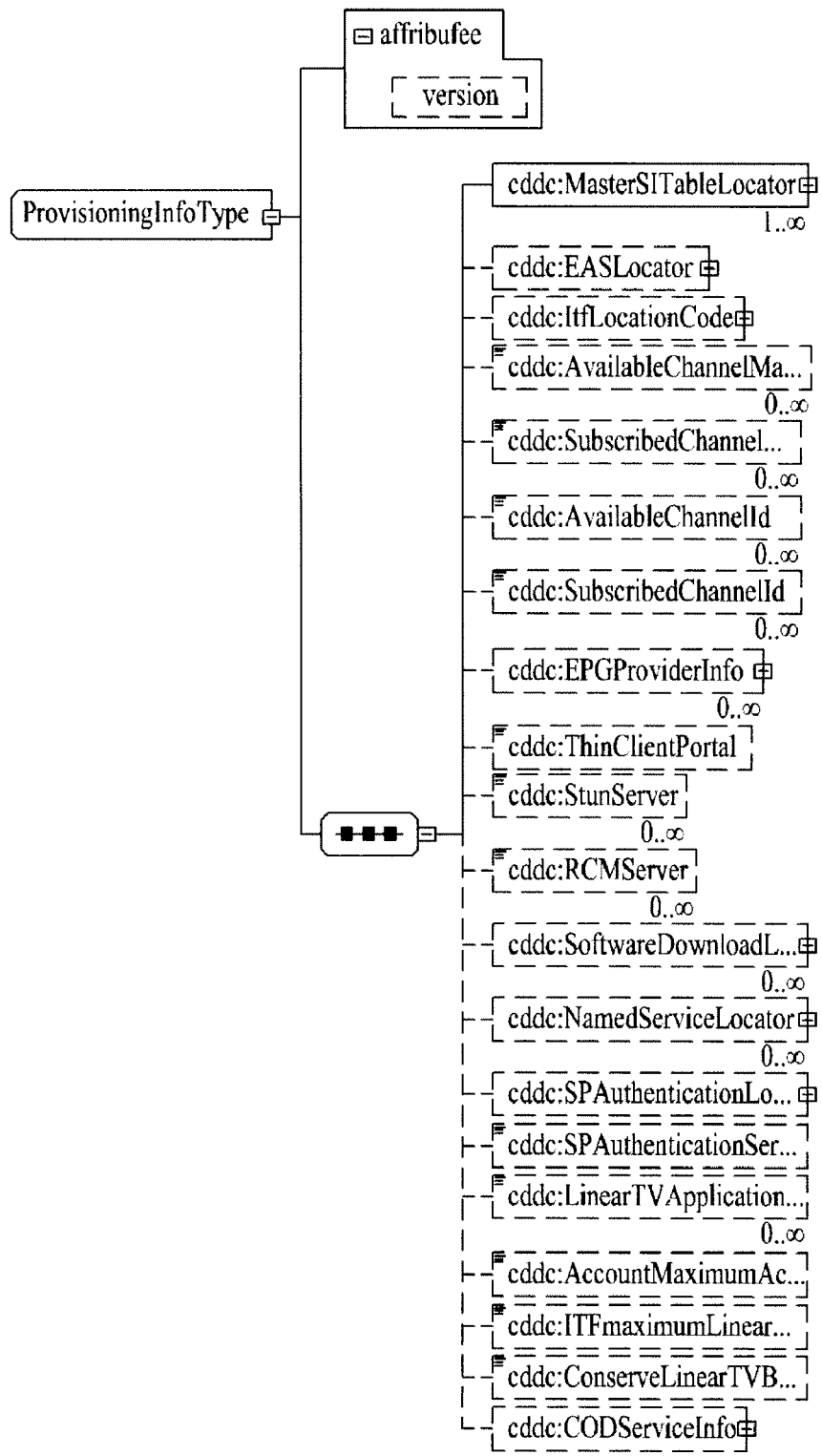
FIG. 11 illustrates an XML Schema on an element of a provisioning information type extended for a COD service according to an embodiment of the present invention . . . .

FIG. 11 illustrates an XML Schema on an element of a provisioning information type extended for a COD service according to an embodiment of the present invention.

Figure 12:
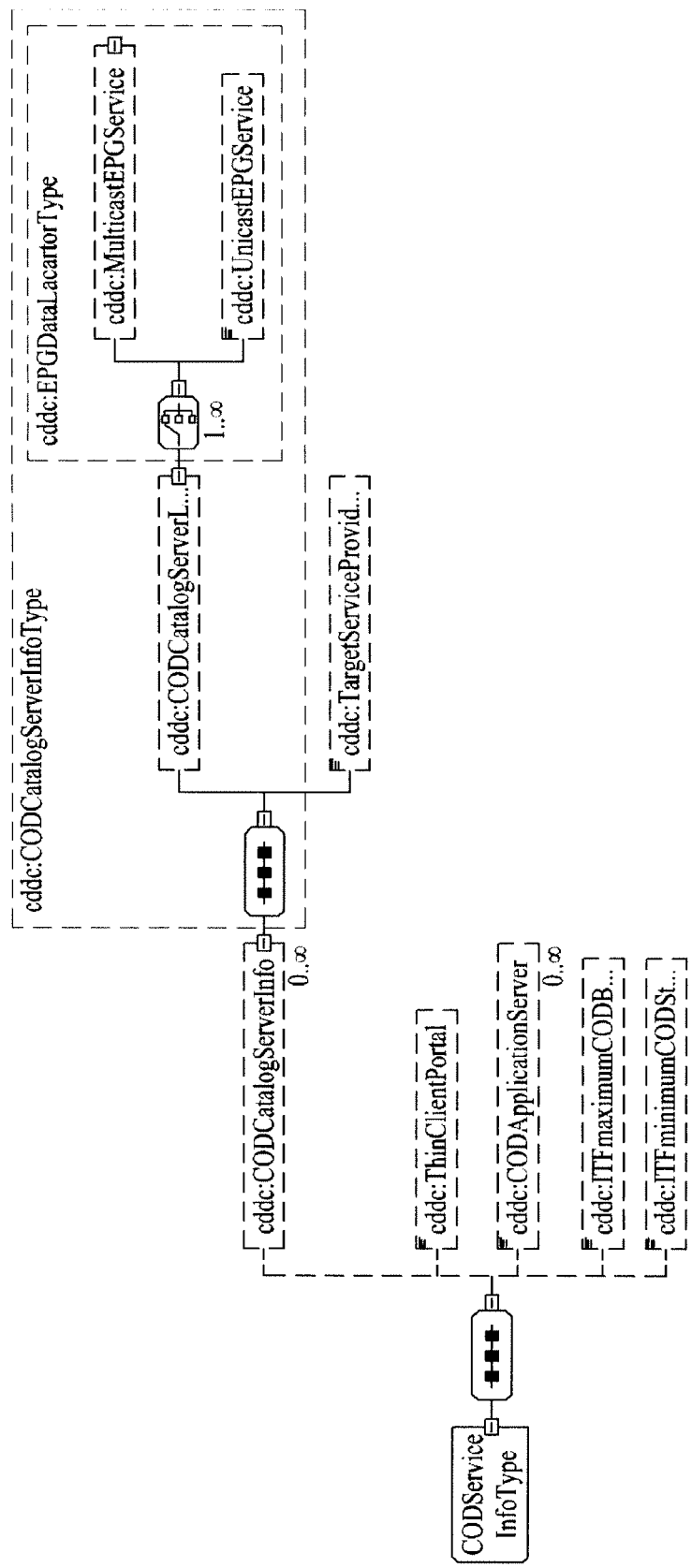
FIG. 12 illustrates an XML Schema on an element of a Provisioning Information Type according to an embodiment of the present invention.

FIG. 12 illustrates an XML Schema on an element of a Provisioning Information Type according to an embodiment of the present invention.

FIG. 13 illustrates an XML Schema on another element of a Provisioning Information Type according to another embodiment of the present invention.

As shown in FIG. 11, the provisioning information type is extended, so as to provide information associated to the COD service . . . . For example, COD service information is added as an element located at the lower end portion of FIG. 11. In FIG. 12 and FIG. 13, the COD service information is illustrated in more detail . . . .

The element of the COD Catalog Server Information, shown in FIG. 12 and FIG. 13, provides access information of a server providing a COD catalog, which corresponds to a group of metadata information of COD contents. A target service provider ID may be optionally provided as a lower element, and the information provided by the corresponding COD Catalog Server through the target service provider ID may identify a valid service provider. The COD Catalog Server being provided through a Provisioning information table may provide content metadata on all COD services, which are provided by the corresponding service provider.

If the storage space of the COD content metadata equipped in the user equipment is sufficiently large enough to store the entire metadata, the user equipment may access the COD Catalog server, which provides all COD content metadata provided by the service provider through the provisioning information table, so as to receive the metadata.

Conversely, if the storage space of the metadata of the user equipment is not sufficiently large enough, a method of receiving only the metadata of the COD service, which the user currently wishes to navigate, thereby performing navigation, may be used. This may be supported by a catalog location provisioning method for each COD Virtual Channel.

When Thin client is supported, Thin client being a method of using a service through an HTTP browser, the element of a Thin Client Portal, shown in FIG. 12 and FIG. 13, provides the URI of a thin client portal, which provides the service. The thin client portal URI included in the COD service information of the Provisioning Information Table may become the URI of a main page that can access all COD services of the Service provider.

The element of the COD Application Server, shown in FIG. 12 and FIG. 13, designates a server address of a specific application, which performs a COD application function. The COD Application Function corresponds to a Server-side function that supports procedures required for using a COD service, such as browsing, searching, selecting, purchasing, and so on. For example, the COD Application Function may also correspond to search/navigation/selection functions of the content, and a user condition (e.g., term)/purchase and payment/settlement functions of the content.

If an element of the COD Application Server is not designated, the SD server or catalog server may perform the above-described functions, or a communication with the COD application server may be transparently routed to the IPTV client . . . .

The element of the ITF Maximum COD Bandwidth, shown in FIG. 12 and FIG. 13, may be optionally designated and may designate a maximum bandwidth of an access link that is to be used for using the COD service.

The element of the ITF Minimum COD Storage Space, shown in FIG. 12 and FIG. 13, designates a minimum size of the content storage space of a user equipment required for using a COD service of the SP. When this value is not designated, it is assumed and concluded that a separate storage space is not required for using the COD service.

Figure 14:
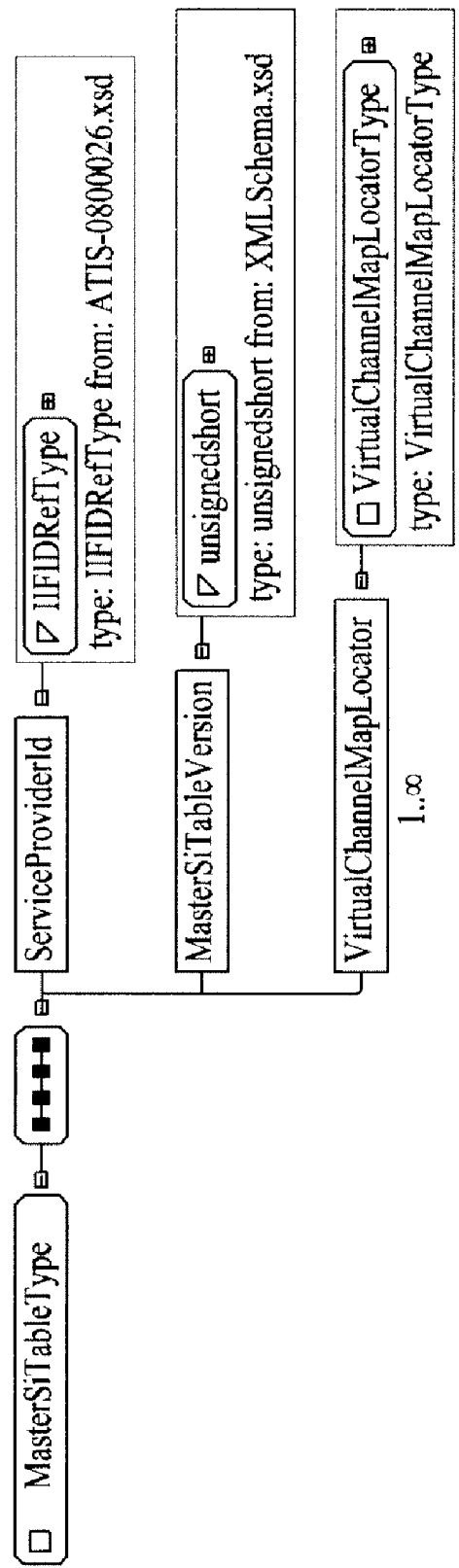
FIG. 14 illustrates an XML Schema on an element of a Master SI Table Type according to an embodiment of the present invention . . . .

FIG. 14 illustrates an XML Schema on an element of a Master SI Table Type according to an embodiment of the present invention . . . . Hereinafter, referring to FIG. 14, the XML Schema on an element of the Master SI Table Type according to an embodiment of the present invention will now be described in detail . . . .

The Master SI Table corresponds to a table managing a list of all virtual channel maps and the respective versions. Herein, the ITF may recognize whether or not the SI information has been updated, by monitoring the Master SI Table . . . .

The element of the Service provider ID corresponds to an identifier that can uniquely identify the service provider. Herein, the element may use a registered domain name.

The element of the Master SI Table Version indicates whether or not there is a change in the Master SI table and its lower SI components. And, by monitoring the version, the update status of the entire SI information may be verified.

The element of the Virtual Channel Map Locator provides access information that can receive the Virtual Channel Map included in the Master SI Table. When an update occurs in the Virtual Channel Map designated by this element, the version of the Master SI table may also be increased (or updated) . . . .

Figure 15:
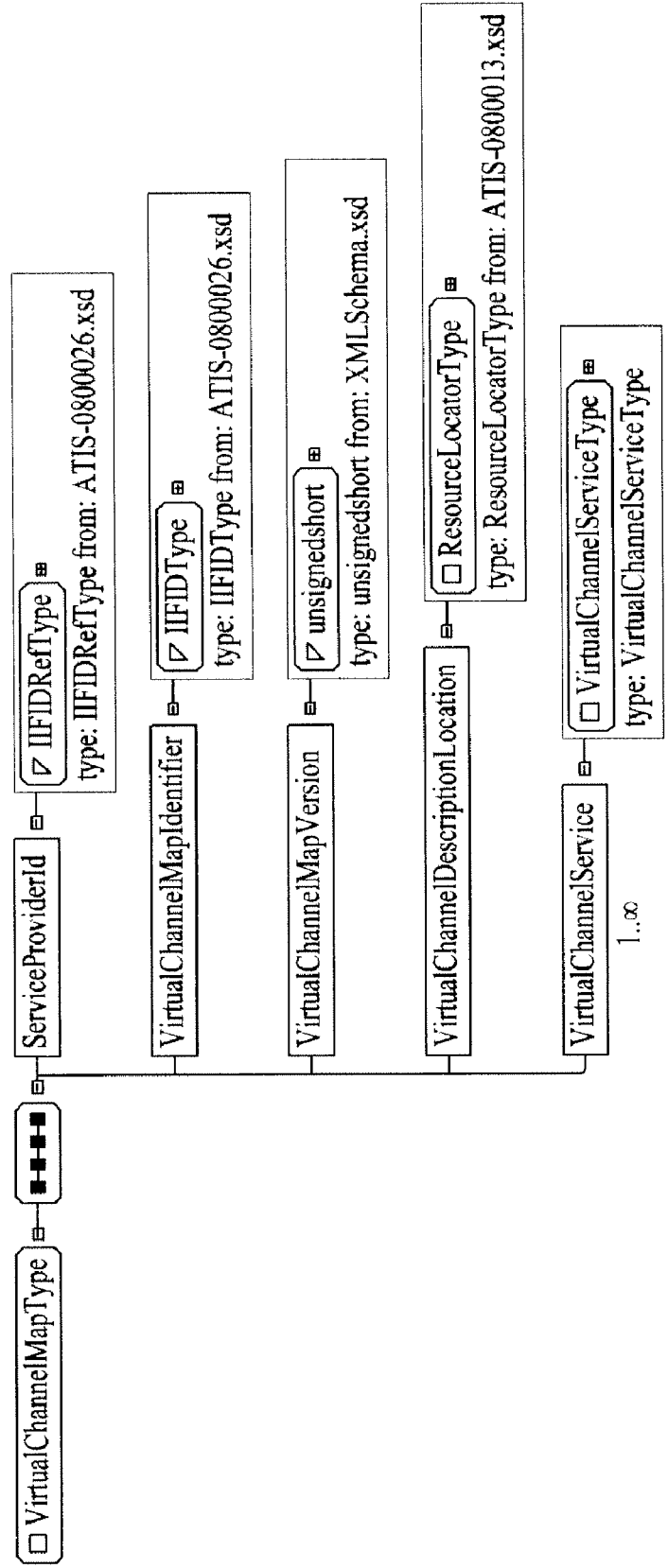
FIG. 15 illustrates an XML Schema on an element of a Virtual Channel Map Type according to an embodiment of the present invention.

FIG. 15 illustrates an XML Schema on an element of a Virtual Channel Map Type according to an embodiment of the present invention. Hereinafter, the XML Schema on an element of the Virtual Channel Map Type according to an embodiment of the present invention will now be described in detail.

The Virtual channel map includes a list of virtual channels, and instead of including detailed information on the channel, the Virtual channel map separately provides address information that can receive the detailed information . . . . More specifically, the Virtual channel map performs the role of a grouped form of channel package.

An element of the Service Provider ID corresponds to an identifier that can uniquely identify the service provider. Herein, the element may use a registered domain name.

An element of the Virtual Channel Map Identifier corresponds to an identifier that can uniquely identify the virtual channel map.

An element of the Virtual Channel Map version indicates whether or not a change occurs in the lists of channels configuring the channel map. Herein, when a channel is added or deleted, this element is changed.

An element of the Virtual Channel Description Location includes position (or location) information of the detailed information for each channel.

An element of the Virtual Channel Service indicates the services included in the virtual channel map.

Figure 16:
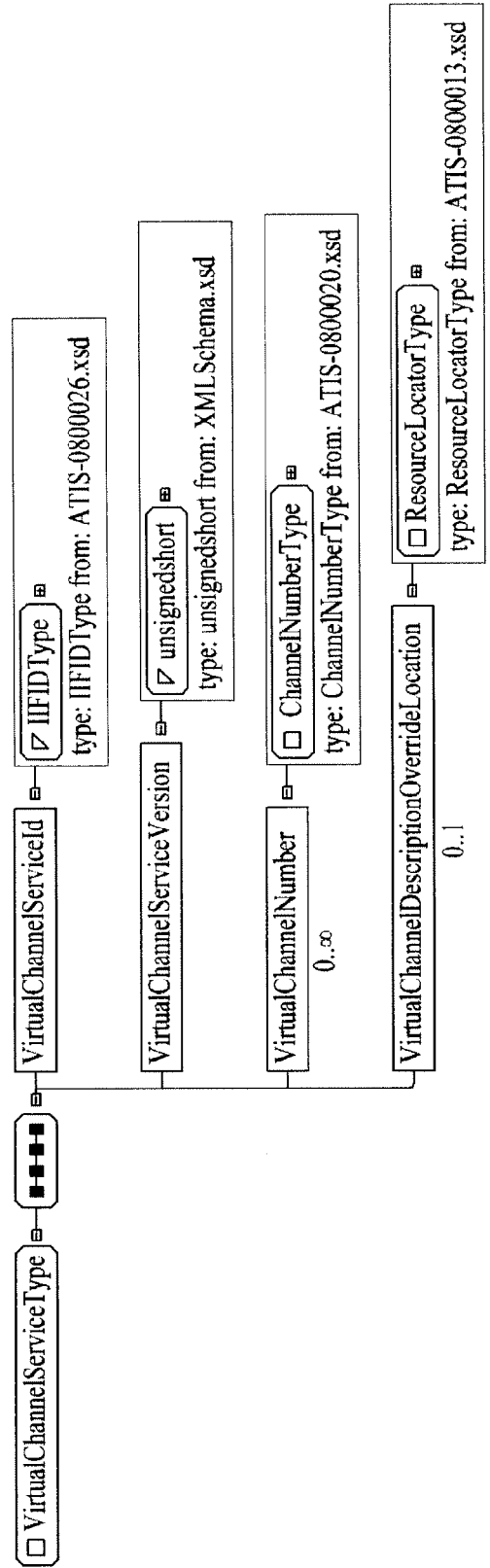
FIG. 16 illustrates an XML Schema on an element of a Virtual Channel Service Type according to an embodiment of the present invention.

FIG. 16 illustrates an XML Schema on an element of a Virtual Channel Service Type according to an embodiment of the present invention. Hereinafter, referring to FIG. 16, the XML Schema on an element of the Virtual Channel Service Type according to an embodiment of the present invention will now be described in detail.

The Virtual channel service type includes the basic information of a virtual channel service included in the virtual channel map. However, the Virtual channel service type does not include detailed information of the channel . . . .

An element of the Virtual channel service ID corresponds to an identifier uniquely identifying the service.

An element of the Virtual channel service version increases when a description of the corresponding virtual channel is changed, and then signals any update . . . .

An element of the Virtual channel number designates a virtual channel number assigned to each service . . . .

In case of a virtual channel that is to receive a detailed description from another location other than the virtual channel description location designated from the virtual channel map, an element of the Virtual channel description override location overrides the designated location value, so as to designate a new location . . . .

Figure 17:
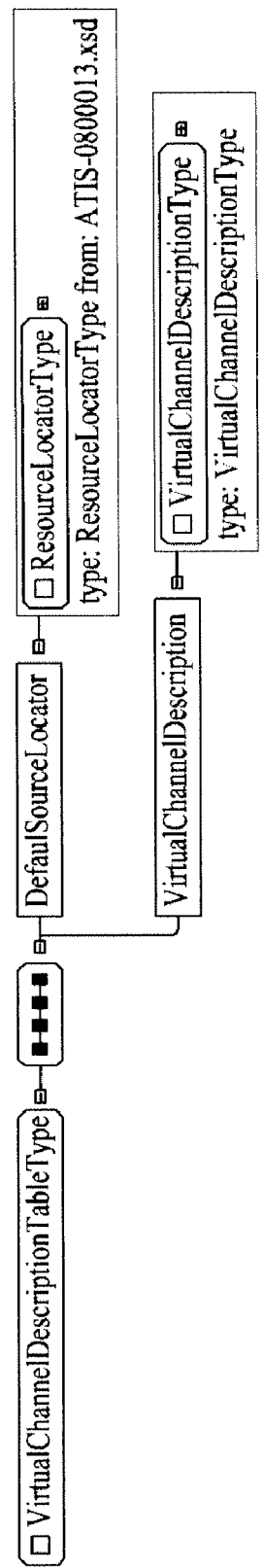
FIG. 17 illustrates an XML Schema on an element of a Virtual Channel Description Table Type according to an embodiment of the present invention.

FIG. 17 illustrates an XML Schema on an element of a Virtual Channel Description Table Type according to an embodiment of the present invention. Hereinafter, referring to FIG. 17, the XML Schema on an element of the Virtual Channel Description Table Type according to an embodiment of the present invention will now be described in detail.

The XML schema of the Virtual Channel Description Table Type corresponds to a table structure carrying a detailed description for each Virtual Channel.

An element of the Default Source Locator designates an address of a Source Table providing a media source information that can be applied to all Virtual Channels. Each Virtual Channel may use a basic Source address designated by this value as the address for acquiring the Source, or may designate a separate address so as to override the basic address.

An element of the Virtual Channel Description corresponds to an element carrying the description of each Virtual Channel. Herein, this element has the Virtual Channel Description Type.

Figure 18:
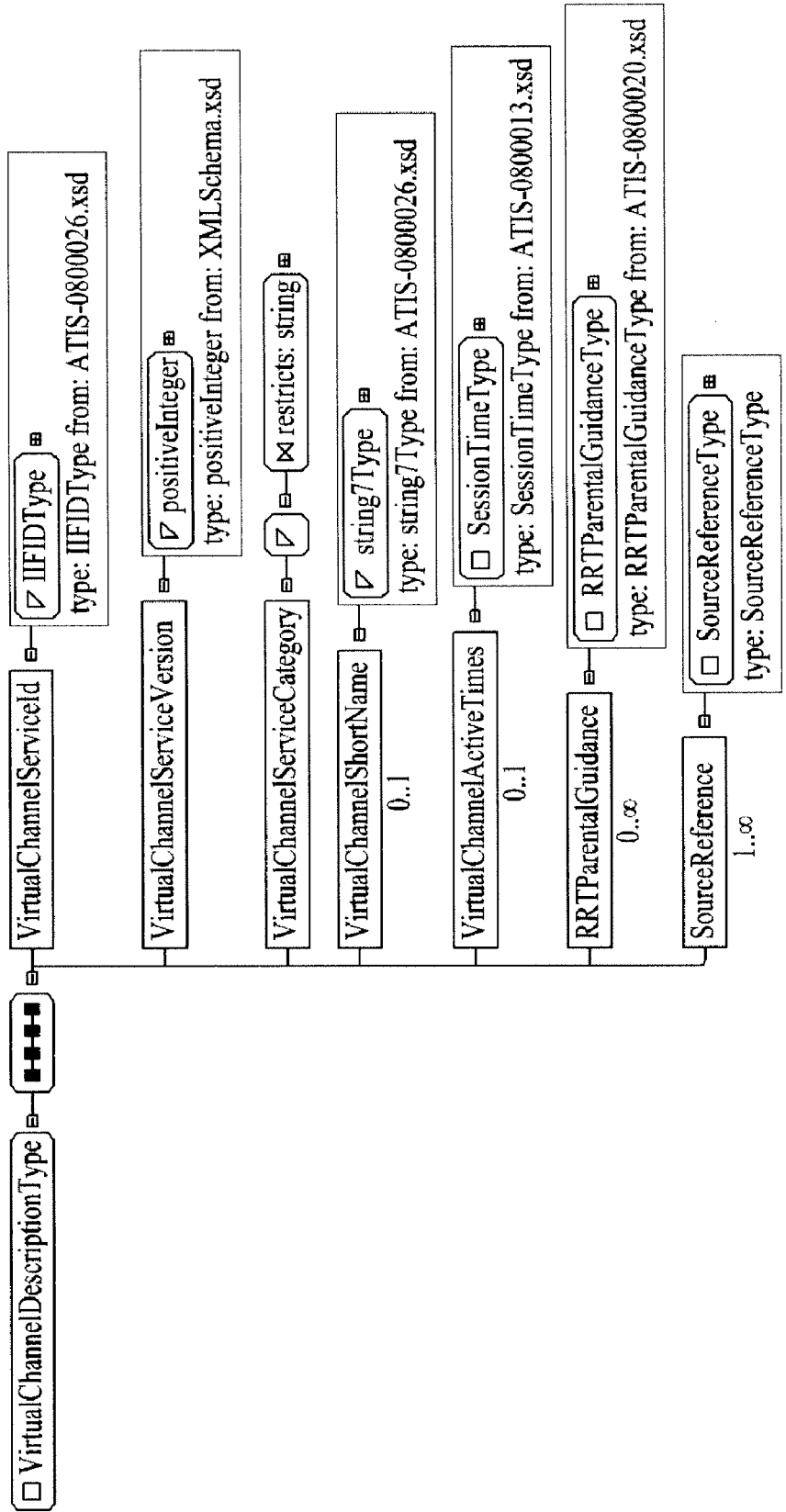
FIG. 18 illustrates an XML Schema on an element of a Virtual Channel Description Table Type according to another embodiment of the present invention.

FIG. 18 illustrates an XML Schema on an element of a Virtual Channel Description Table Type according to another embodiment of the present invention. Hereinafter, referring to FIG. 18, the XML Schema on an element of the Virtual Channel Description Table Type according to another embodiment of the present invention will now be described in detail.

An element of the Virtual Channel Service ID corresponds to an identifier that can uniquely identify the Virtual Channel.

An element of the Virtual Channel Service Version indicates a version of the Virtual Channel Description element, and the element increases each time a change occurs in the Virtual Channel Description element.

An element of the Virtual Channel Service Category indicates a service type of the channel. Herein, this element indicates whether the corresponding channel is a Linear TV channel or a COD Service channel.

A Virtual Channel Short Name element indicates a name of the channel in a short text value of 7 or less letters. For example, this element may have a value such as "WABC"....

An element of the Source Reference provides information related to the media source of the Virtual Channel Service. Through this element, access information required for using the VC (virtual channel) may be acquired, and at least one or more elements may exist.

Figure 19:
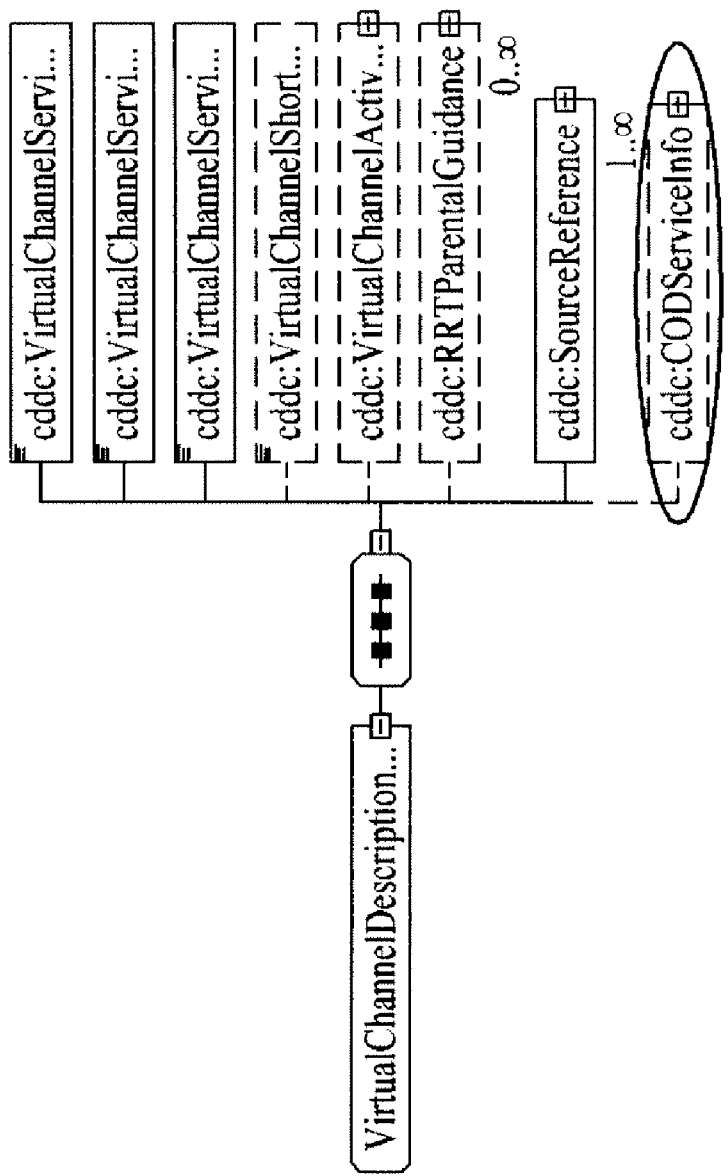
FIG. 19 illustrates an XML Schema on an element of a Virtual Channel Description Table Type extended for a COD service according to an embodiment of the present invention.

FIG. 19 illustrates an XML Schema on an element of a Virtual Channel Description Table Type extended for a COD service according to an embodiment of the present invention. Hereinafter, referring to FIG. 19, the XML Schema on an element of the Virtual Channel Description Table Type extended for the COD service according to an embodiment of the present invention will now be described in detail.

The Virtual Channel Description table of FIG. 19 is extended not only for the current real-time broadcast channel service, the Linear TV service, but also for the COD service....

As shown in FIG. 19, information associated to the COD service is to be provided by extending the Virtual Channel Description Type. Such information is provided by grouping information associated to the COD service as an element of the CODServiceInfoType, which is located at the lower end. This has already been described in detail with reference to FIG. 12 and FIG. 13.

The Virtual Channel Description table of FIG. 19 is extended not only for the Linear TV service, the current real-time broadcast channel service, but also for the COD service....

As shown in FIG. 19, information associated to the COD service is to be provided by extending the Virtual Channel Description Type. Such information corresponds to an element of the COD Service Info Type, which is located at the lower end of FIG. 19, and a detailed XML schema of the same according to the embodiment of the present invention has been described with reference to FIG. 12 and FIG. 13. Therefore, since reference may be made to FIG. 12 and FIG. 13 in order to understand FIG. 19, detailed description of the same will be omitted for simplicity.

Figure 20:
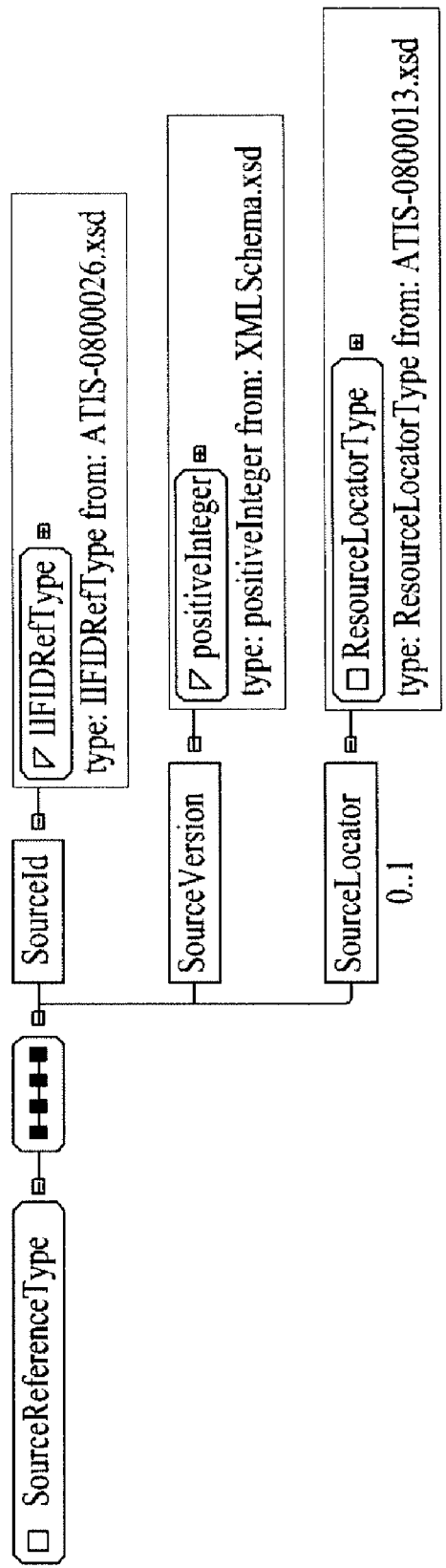
FIG. 20 illustrates an XML Schema on an element of a Source Reference Type according to an embodiment of the present invention.

FIG. 20 illustrates an XML Schema on an element of a Source Reference Type according to an embodiment of the present invention .... Hereinafter, referring to FIG. 20, the XML Schema on an element of the Source Reference Type according to an embodiment of the present invention will now be described in detail.

FIG. 20 corresponds to a structure that refers to a Source Element carrying media source information of the Virtual Channel Service.

An element of the SourceId is an identifier that refers to a Source element.

An element of the SourceVersion is a version that refers to a Source element.

An element of the SourceLocator provides a location capable of receiving a Source element that can be referred to .... In case a Default Source Locator and this element co-exist, this element overrides the default value.

Figure 21:
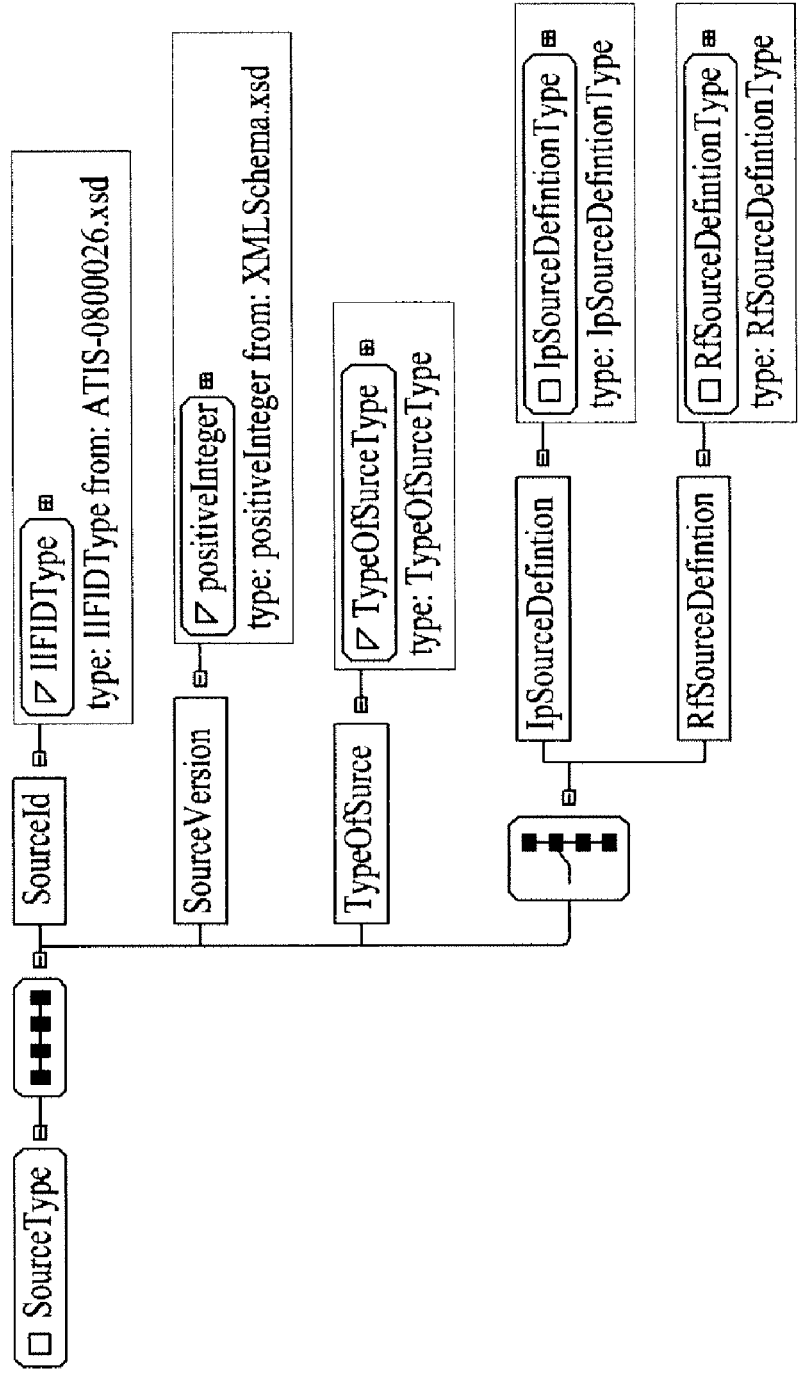
FIG. 21 illustrates an XML Schema on an element of a Source Type according to an embodiment of the present invention . . . .

FIG. 21 illustrates an XML Schema on an element of a Source Type according to an embodiment of the present invention. Hereinafter, referring to FIG. 21, the XML Schema on an element of the Source Type according to an embodiment of the present invention will now be described in detail.

FIG. 21 corresponds to an XML schema of the SourceType, which carries information required for acquiring a media source of the Virtual Channel Service.

An element of the SourceId is an identifier that refers to a Source element. This identifier should be able to uniquely identify this Source element nationwide.

An element of the SourceVersion is a version that refers to a Source element. This element should increase each time the content of the Source element is changed.

A TypeOfSource element corresponds to a value indicating the attribute of the corresponding Source, which can have attributes such as HD, SD, PIP, Barker, and so on.

A Barker channel corresponds to a channel specified for advertising or public relations (PR) purposes. When viewing in not available due to an absence of authority in a corresponding channel, the Barker channel is automatically selected to perform the role of advertizing the corresponding channel and to provide subscription guidance....

An element of the IpSourceDefinition provides access information of a media source, which is being delivered through an IP network, and may also indicate a Multicast IP address, transmission protocols, and various parameters.

An element of the RfSourceDefinition provides access information of a media source, which is being delivered through a cable TV network.

Figure 22:
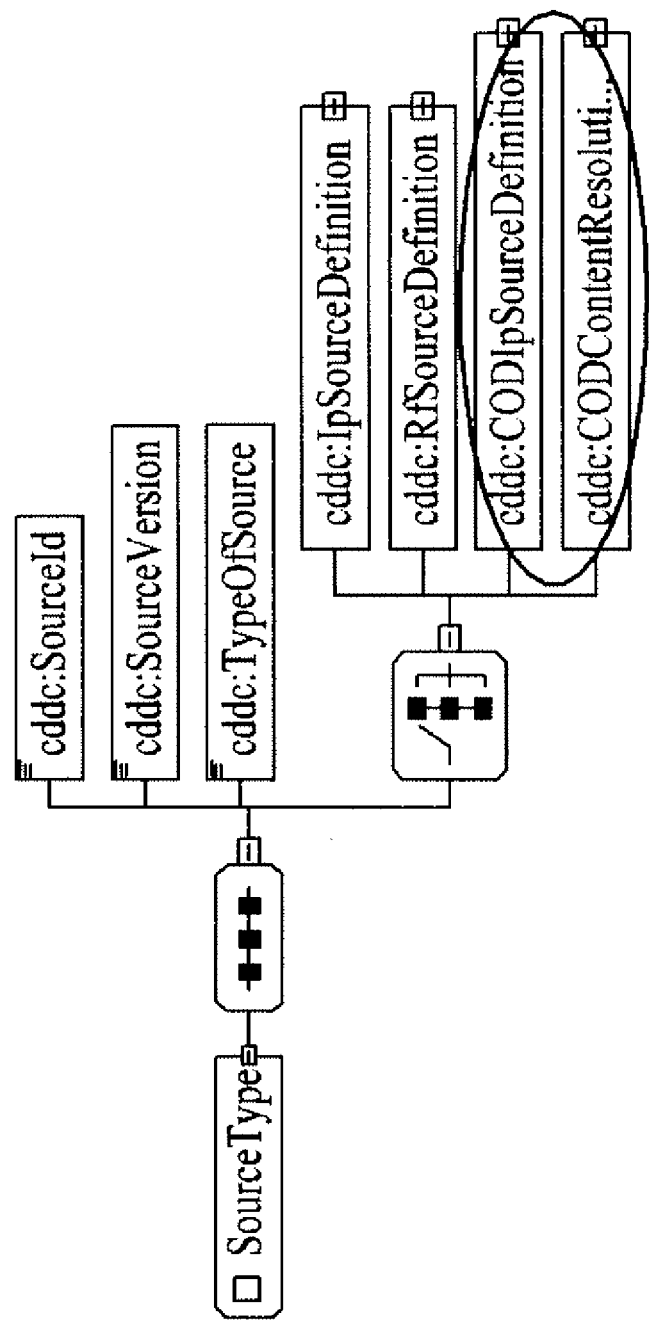
FIG. 22 illustrates an XML Schema on an element of a Source Type extended for a COD service according to an embodiment of the present invention.
Figure 24:
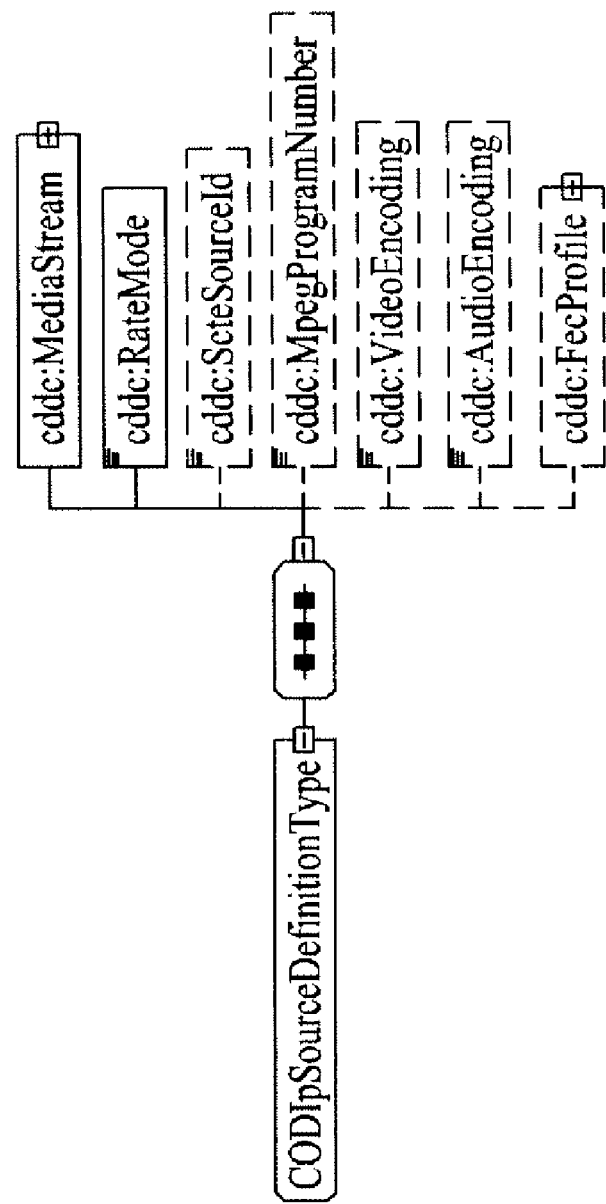
FIG. 24 illustrates an XML Schema on an element of a CODIpSourceDefinition Type added for a COD service according to an embodiment of the present invention.
Figure 25:
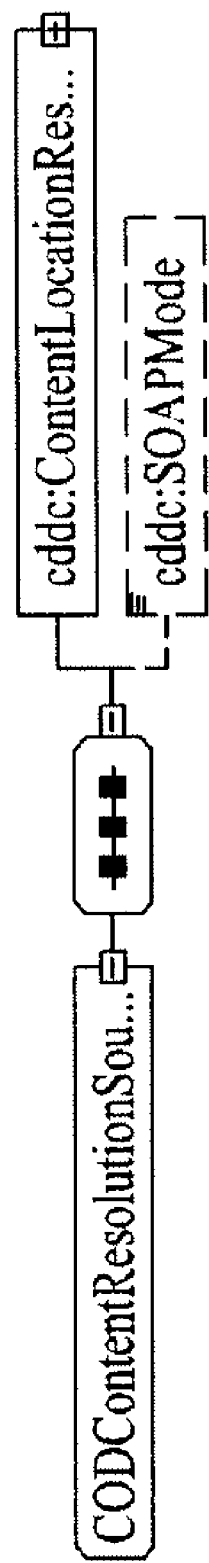
FIG. 25 illustrates an XML Schema on an element of a CODContentResolutionSourceDefinition Type added for a COD service according to an embodiment of the present invention.

FIG. 22 illustrates an XML Schema on an element of a Source Type extended for a COD service according to an embodiment of the present invention .... FIG. 23 illustrates an XML Schema on an element of a TypeOfSource type extended for a COD service according to an embodiment of the present invention. FIG. 24 illustrates an XML Schema on an element of a CODIpSourceDefinition Type added for a COD service according to an embodiment of the present invention. FIG. 25 illustrates an XML Schema on an element of a CODContentResolutionSourceDefinition Type added for a COD service according to an embodiment of the present invention.

As shown in FIG. 22, information associated to the COD service is to be provided by extending the SourceType. Such information respectively corresponds to 2 elements added, as shown in FIG. 22, such as CODIPSourceDefinition and CODContentResolutionSourceDefinition.

When a Media source of the COD VirtualChannel Service is provided through an IP network, an element of the CODIPSourceDefinition carries a parameter required for acquiring the media source. Therefore, access may be directly made to the corresponding COD Content through this element.

For example, when a Content named "Spiderman" is being provided in 2 versions, HD and SD, configuring and providing a separate Source Element for each instance may be considered. Also, even if the version is the same, in case the user is located in a different region, the content may be provided from a different server. And, in this case, acquisition information of a different Content for each region may be provided to a separate Source element.

In this case, the Source element provides access information of one Instance of the Content.

The XML schema corresponding to the above is shown in FIG. 24.

An element of the MediaStream indicates an access information of the Media source as a ResourceLocator Type.

Unlike the element of the CODIPSourceDefinition, instead of directly providing access information of a Content Instance, an element of the CODContentResolutionSourceDefinition signals an address of a Content Location Resolution Server, which can Query and obtain information that can acquire all contents of the corresponding COD VirtualChannel Service . . . . In this case, access cannot be directly made to the COD Content through the Source element . . . . Instead, a designated Content Location Resolution Server should be accessed by using a Source element, so as to inquire about the Location of the content, which the user wishes to purchase, thereby acquiring the access information and obtaining the content based upon the acquired access information.

This case is advantageous in that since only one Source element per Service is required, instead of one Source element per content Instance, the amount of signaling data decreases.

The XML schema corresponding to the above is shown in FIG. 24.

An element of the ContentLocationResolutionServerLocator provides access information of a server that can be acquired by inquiring about the Location of the Content by using the Resource Locator Type. The inquiry may be requested by using an HTTP method so as to transmit an identifier of the Content and user information to the parameter. Alternatively, a Content Location Resolution result of all content within a service may be configured in a Content referencing table format, which is then transmitted via multicast . . . . Thereafter, the result may be stored in the user equipment, thereby enabling reference to be made to the corresponding result locally.

Also, when a SOAPMode element exists, and when the corresponding value is TRUE, a SOAP-based Query method may be used.

Further, in order to signal Source information of the above-described COD Content, FIG. 23 is newly defined so as to extend the TypeOfSource and to identify (or differentiate) the source of the COD Content.

When the TypeOfSource element corresponds to CODContentHD or to CODContentSD, the corresponding Source element indicates access information of a specific COD Content instance. And, in case of the CODContentHD, the instance corresponds to an HD-level COD Content. And, in case of the CODContentSD, the instance corresponds to an SD-level COD Content.

When the TypeOfSource element corresponds to the CODContentLRServerLocator, the Source element signals the address of a server that can acquire the Location of Contents belonging to the corresponding COD Service, i.e., access information.

Figure 26:
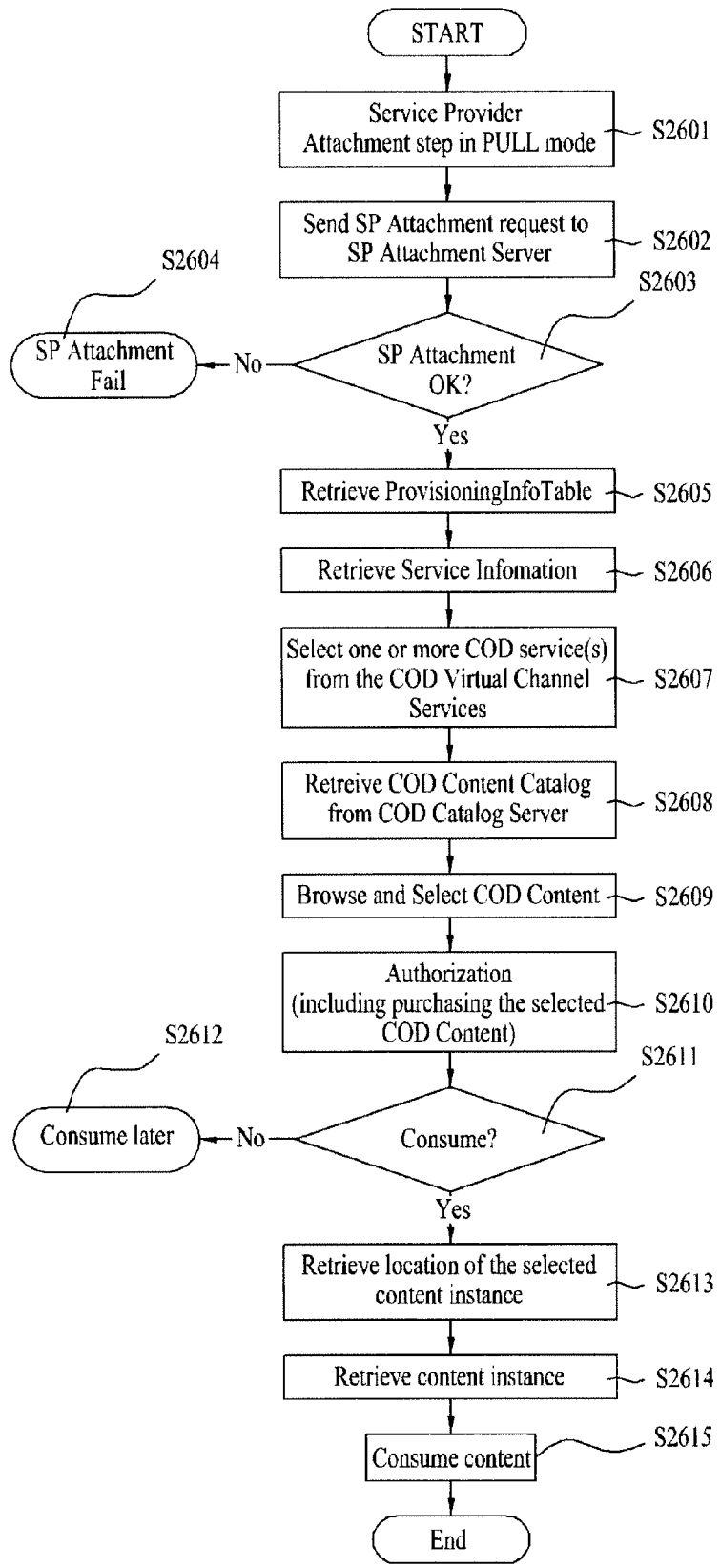
FIG. 26 illustrates an exemplary flow of a receiver performing service discovery operations in order to use a COD service according to an embodiment of the present invention.
Figure 27:
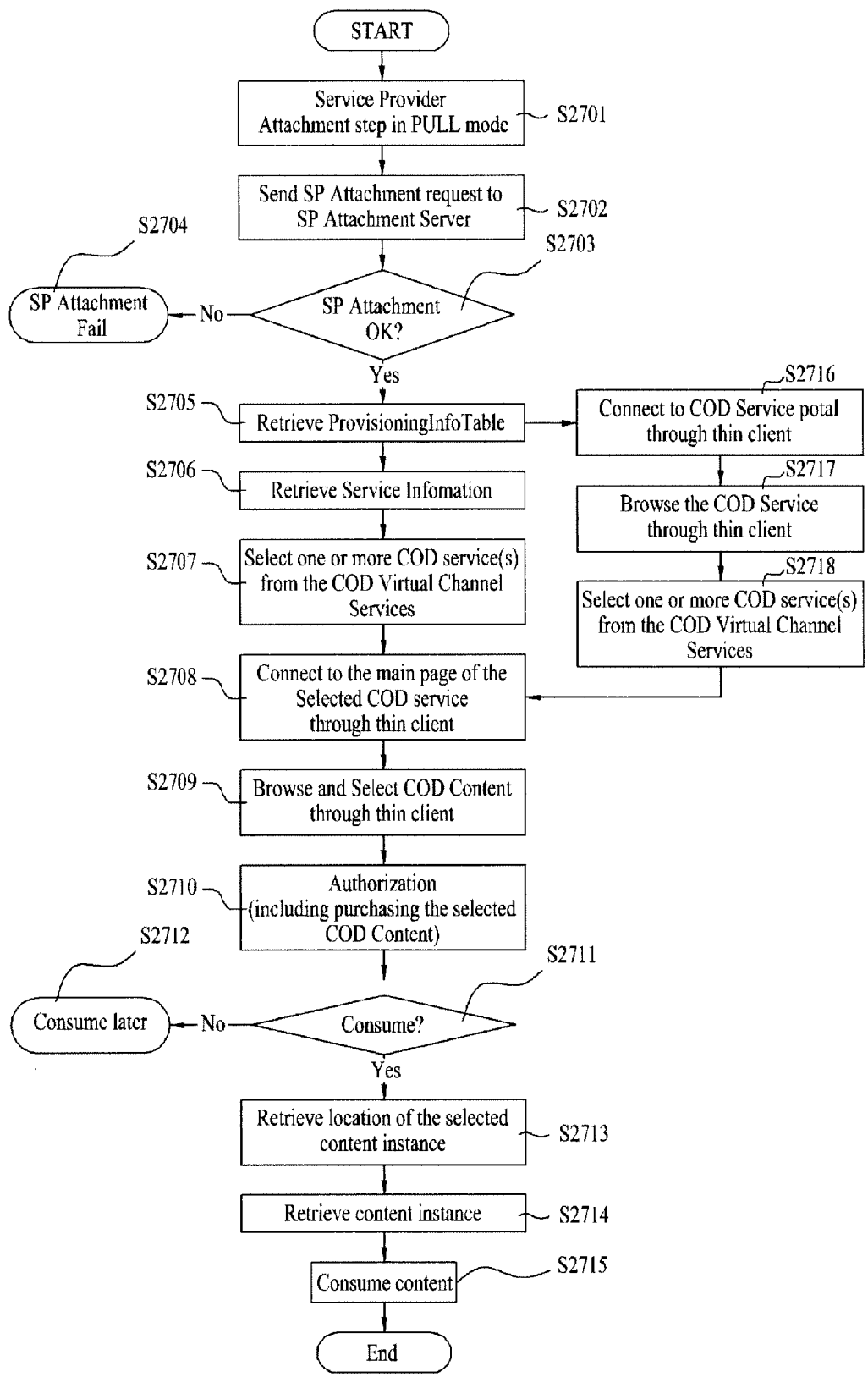
FIG. 27 illustrates another exemplary flow of a receiver performing service discovery operations in order to use a COD service according to an embodiment of the present invention . . . .

FIG. 26 illustrates an exemplary flow of a receiver performing service discovery operations in order to use a COD service according to an embodiment of the present invention. FIG. 27 illustrates another exemplary flow of a receiver performing service discovery operations in order to use a COD service according to an embodiment of the present invention.

FIG. 26 illustrates a case of a Thick client, wherein the receiver receives and processes Metadata, and FIG. 27 illustrates a case of a Thin client model, wherein a considerable amount of Metadata remains in the server and wherein such remaining Metadata are accessed through a Client function, such as a Web Browser, so as to be used.

In case of the Thick client, after receiving the Service Information, the SI Metadata is processed. Then, the usage of the COD service begins with selecting the COD Virtual Channel Service among the SI Metadata. In order to acquire the COD Content list and detailed information included in the selected COD VC (virtual channel) service, an address of the COD Catalog Server is acquired by using the above-described methods, so as to acquire Content Catalog information. Subsequently, Browsing, Navigation, and Searching are performed on the acquired Content Catalog, so as to select the Content that the user wishes to consume, thereby acquiring a consumption right through the Authorization procedure. The Authorization procedure may include procedures such as Purchasing, and usage terms/Payment/Settlement, etc. After acquiring the consumption right, the location of the Content that is to be actually consumed is acquired by using the above-described methods. Then, based upon the acquiring information, the content instance is approached (or accessed), so as to perform consumption.

Conversely, in case of the Thin client, the access to the COD Service Portal may be broadly performed in 2 different methods. One of the methods is to use a service by accessing a COD Service Main portal page, which can access the entire COD Services designated in the Provisioning Information Table, via Thin client. Another method is to use a service by directly accessing a Portal Page of a selected COD Service in order to use the selected COD Service, wherein the COD service is selected based upon the received SI information . . . . Once a service is selected, a Content is selected through Content Catalog Browsing, Navigation, and Searching using the Thin client . . . . Then, the procedures of acquiring and consuming rights may be identically realized for both instances.

Among the above-described procedures, the present invention proposes a variety of methods for Browsing the COD Content Catalog, as described below. For example, Browsing may includes methods such as Navigation/Search, and Browsing may be a term collectively referring to a series of procedures for searching (or finding) a wanted (or requested) content from a Content Catalog.

Firstly, in case of the Thin client model, the method is performed by having a server and a user equipment receiving and transmitting an HTML-based Web page to and from one another. More specifically, the Metadata of a Content is in the server, and Browsing is performed by receiving the Web page including the UI and data.

Secondly, in case of the Medium-level client, after storing a small amount of Content metadata in the user equipment through a variety of Delivery mechanisms, the user may perform Browsing locally based upon the stored Content metadata. In this method, when additional metadata are required, the metadata are additionally received from the server so as to be provided.

Thirdly, in case of the High-level client, the user equipment receives and stored the entire COD Content Catalog, thereby performing Local browsing on the stored COD Content Catalog. This method may be supported, in case of the High-level client, wherein sufficient storage space and processing ability are provided in the user equipment.

Also, the purchasing procedure is realized through an Authorization procedure . . . . And, once the purchase is completed, the information of the corresponding content is stored in the Profile information of the user. The user may consume the corresponding content immediately after purchasing, or the user may consume the corresponding content at a different time in the future through a different device. By managing a purchase list information via the user Profile, the purchasing point/device may be separated from the consumption point/device.

When consuming the purchased content, an access information of a consumable instance of the actual Content based upon a Globally unique content ID, which is the only (or unique) identifier of the purchased content is required to be acquired . . . . In order to do so, the embodiment of the present invention proposes a method of searching and finding the actual content instance through the above-described Source Table.

Meanwhile, the steps shown in FIG. 26 and FIG. 27 will now be described in more detail.

As shown in FIG. 26, according to an embodiment of the present invention, a Thick client performs a service provider attachment step in PULL mode (S2601). The thick client sends an SP Attachment request to an SP Attachment Server (S2602). The thick client determines whether the SP Attachment is successful (S2603). The thick client recognizes that the SP Attachment has failed (S2604). The thick client retrieves the provisioning table (S2605). The thick client retrieves the service information (S2606). Then, the thick client selects one or more COD services from the COD Virtual Channel Services (S2607). The thick client retrieves a COD Content Catalog from a COD Catalog server (S2608). The thick client browses and selects a COD content (S2609). The thick client performs an authorization procedure including a step of purchasing the selected COD content (S2610). The thick client determines whether the COD content is consumed (S2611). If no, the thick client consumes the COD content in a later process (S2612). If yes, the thick client retrieves a location of the selected content instance (S2613). The thick client retrieves the content instance (S2614). Thereafter, the thick client consumes the content (S2615).

Meanwhile, as shown in FIG. 27, according to an embodiment of the present invention, a thin client performs a service provider attachment step in PULL mode (S2701). The thin client sends an SP Attachment request to an SP Attachment Server (S2702). The thin client determines whether the SP Attachment is successful (S2703). The thin client recognizes that the SP Attachment has failed (S2704). The thin client retrieves a provisioning table (S2705). The thin client retrieves a service information (S2706). The thin client selects one or more COD services from the COD Virtual Channel Services (S2707). The thin client retrieves a COD Content Catalog from a COD Catalog server (S2708). The thin client browses and selects a COD content (S2709). The thin client performs an authorization procedure including a step of purchasing the selected COD content (S2710). The thin client determines whether the COD content is consumed (S2711). If no, the thin client consumes the COD content in a later process (S2712). If yes, the thin client retrieves location of the selected content instance (S2713). The thin client retrieves the content instance (S2714). Thereafter, the thin client consumes the content (S2715). Furthermore, the thin client connects to a COD service portal through a thin client (S2716). The thin client browses the COD services through the thin client (S2717). The thin client selects one or more COD services from the COD Virtual Channel Services (S2718).

Figure 28:
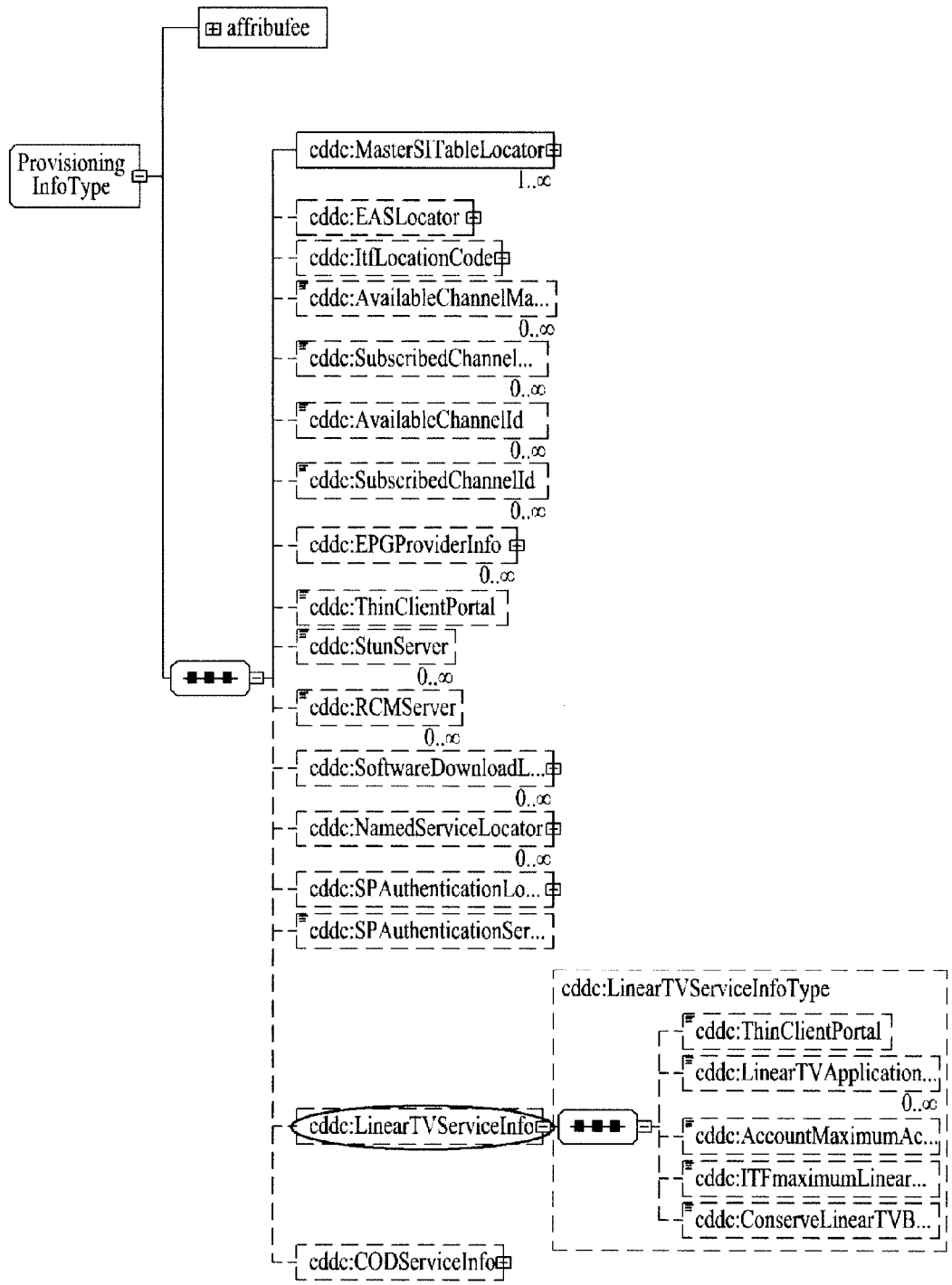
FIG. 28 illustrates an XML Schema on an element of a provisioning information type having a Linear TV Service information added thereto according to an embodiment of the present invention . . . .

FIG. 28 illustrates an XML Schema on an element of a provisioning information type having a Linear TV Service information added thereto according to an embodiment of the present invention. Referring to FIG. 28, the XML Schema on an element of the provisioning information type having a Linear TV Service information added thereto according to an embodiment of the present invention will now be described in detail.

Since the schema of the current ProvisioningInfoType is configured only for the Linear TV, configuration is made so that the information associated to the LinearTV service is positioned immediately below the ProvisioningInfoType. In this case, when adding information on the COD service, there may be a problem in that the two sets of information cannot be clearly differentiated. Therefore, as shown in FIG. 28, the information associated to the LinearTV may be grouped as a separate element, which is referred to as the LinearTVServiceInfo, thereby being provided. With the above-described design, the grouping of diverse information associated to one another is advantageous in that convenience and swiftness in the management may be ensured.

Figure 29:
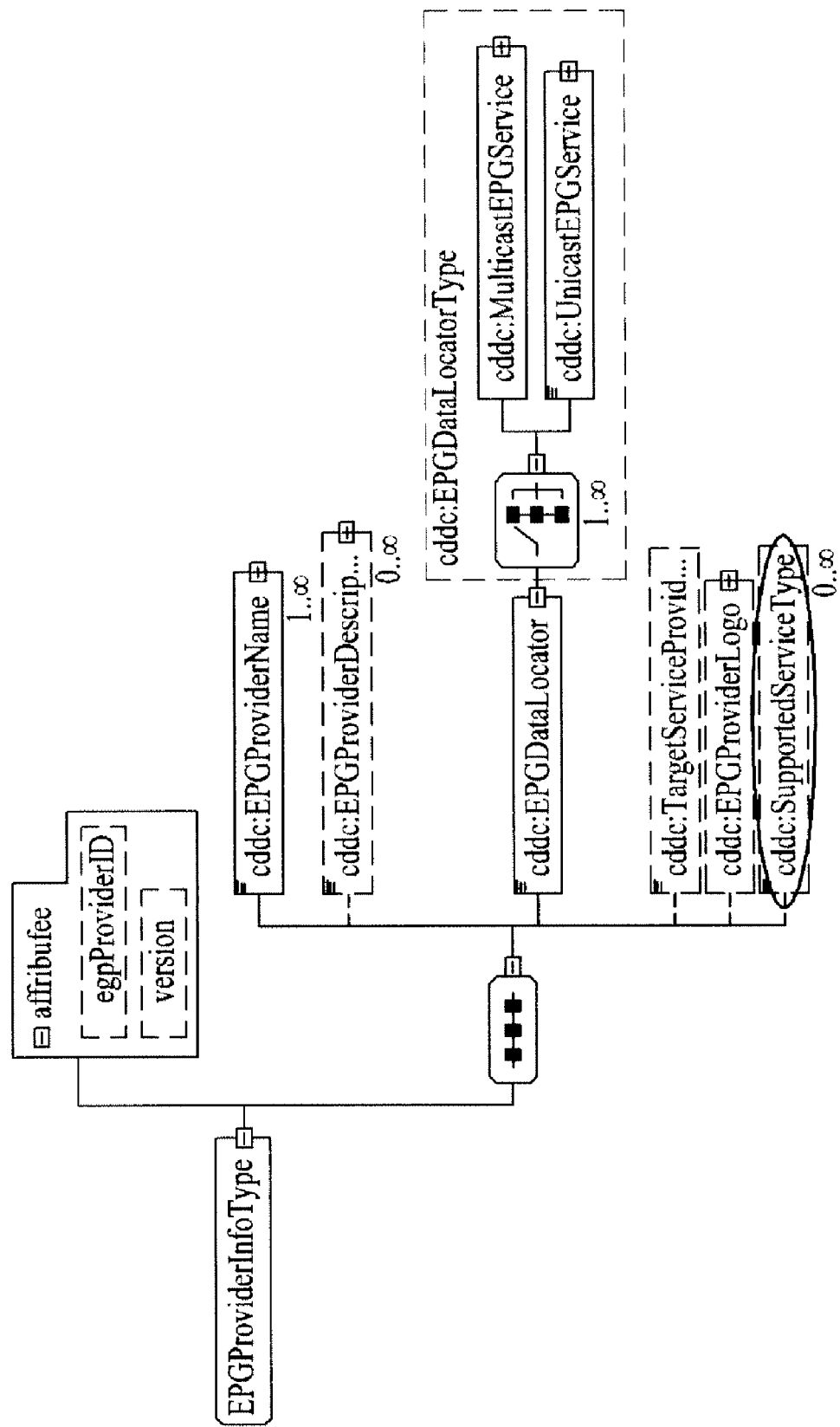
FIG. 29 illustrates an XML Schema on an element of an EPG Provider Information Type according to a first embodiment of the present invention.

FIG. 29 illustrates an XML Schema on an element of an EPG Provider Information Type according to a first embodiment of the present invention . . . . FIG. 30 illustrates a more detailed example of FIG. 29. Hereinafter, a detailed protocol for efficiently managing EPG information on the increasing COD service and linear TV service will no be described. However, the following description is merely exemplary, and, as a general rule, the scope and spirit of the present invention should be interpreted by the contents included in the scope of the claims of the present invention.

In the above description, a method of providing COD service information by using Provisioning information has been described. Among the COD service information, a COD catalog server address and a thin client portal information may be delivered by using an EPG provider information and a thin client portal information that are used for the linear TV service.

The EPG Provider Information, shown in FIG. 29 and FIG. 30, for example, provides information required for receiving the EPG data. More specifically, the EPG Provider Information, which gives (or provides) locations where EPG data are positioned from an EPG data provider, can be accessed.

The EPG Provider ID corresponds to an identifier that can uniquely identify the provider providing the EPG. For example, a registered domain name may be used.

A Version indicates the version of the EPG Provider Information.

An EPG Provider Name indicates a text name of the EPG provider, and a name may be provided for each language . . . .

An EPG Provider Description carries a detailed text description on the EPG provider, and a description may be provided for each language . . . .

An EPG Data Location signals an IP address and protocol, and so on, that can be received.

A Target Service Provider ID describes IDs of an IPTV SP supported by the EPG provider.

An EPG Provider Logo provides a URI of the logo of the EPG provider.

Particularly, in the embodiment of the present invention, in additional to the linear TV service, in order to separately and efficiently manage EPG data on the COD service, an element of the Supported Service Type is added. However, the element according to the embodiment of the present invention will not be limited to this term . . . . And, the element of the Supported Service Type may also be referred to as a type of target services element. Hereinafter, the present invention will be described by using the two terms, and both terms may be interpreted as the same meaning within the description and drawings of the present invention. The type of target services element gives (or provides) a type of service that is covered by each of the EPG data provider's EPG data sources.

More specifically, the type of target services element identifies whether the corresponding EPG provider provides EPG metadata on all service or whether the corresponding EPG provider provides information on a specific service (e.g., Linear TV service, COD service).

FIG. 31 illustrates a more detailed XML Schema on an element of a Supported Service Type shown in FIG. 29. Hereinafter, the more detailed XML Schema on an element of the Supported Service Type shown in FIG. 29 will now be described.

As shown in FIG. 31, when the above-described EPG provider provides EPG metadata on all types of service, the type of target services element has a value corresponding to "All".

Meanwhile, when the above-described EPG provider provides EPG metadata on the linear TV service, the type of target services element has a value corresponding to "Linear TV" . . . . Also, when the above-described EPG provider provides EPG metadata on the COD service, the type of target services element has a value corresponding to "COD service" . . . .

Since the type of target services element can have hundreds of values starting from, for example, '0', the type of target services element may signal all supportable service types.

As described in FIG. 29 to FIG. 31, by using the newly added type of target services element, the receiver may identify the EPG provider providing the EPG metadata on the COD service. Also, the receiver may access the EPG provider so as to receive only the wanted (or requested) EPG metadata. This is advantageous in that this method can be identically applied to any other services that are to be added in later processes, as well as to the COD service.

Figure 32:
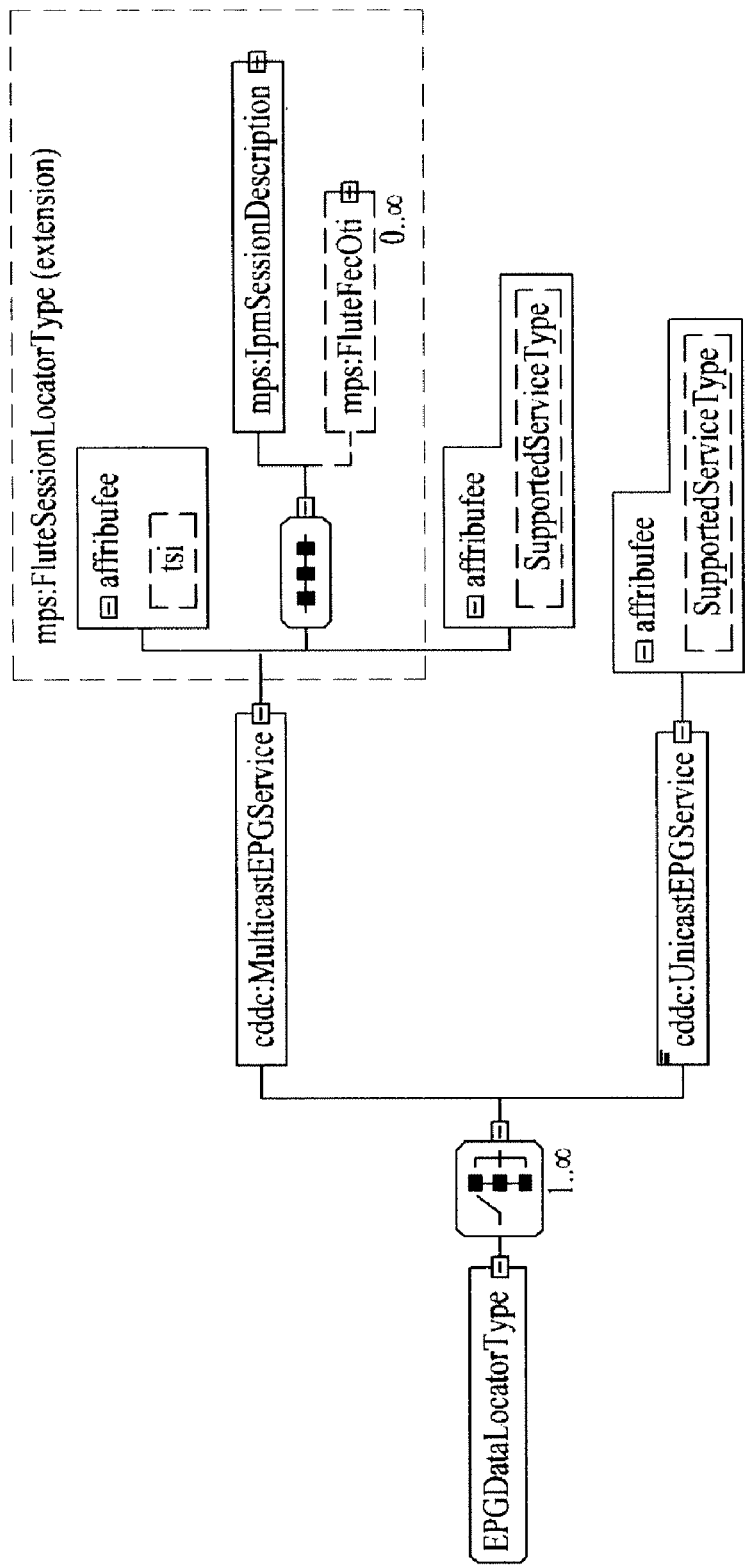
FIG. 32 illustrates a more detailed XML Schema on an element of an EPG Data Locator Type shown in FIG. 29 . . . .

FIG. 32 illustrates a more detailed XML Schema on an element of an EPG Data Locator Type shown in FIG. 29. FIG. 33 illustrates a more detailed example of FIG. 32.

By using the EPG Provider information, n number of locations of the EPG data being provided by the EPG provider may be provided. In this case, for each EPG data location, a different type of EPG data may be provided. In order to signal such EPG data, an EPG Data Locator should be extended, as shown in FIG. 32 and FIG. 33. Meanwhile, the EPG Data Locator gives (or provides) a location where the EPG data can be accessed in a pull mode or a push mode.

The EPG metadata uses the FLUTE to be transmitted in a multicast format, or to be transmitted in a unicast format. As shown in FIG. 32, when transmitted in the multicast format, the EPG metadata may be signaled through a Multicast EPG Service . . . . And, conversely, when transmitted in the unicast format, the EPG metadata may be signaled through a Unicast EPG Service.

Further, according to the embodiment of the present invention, as shown in FIG. 32, the above-described type of target services element is added to the Multicast EPG Service and the Unicast EPG Service . . . . Accordingly, the service type supported by each stream may be signaled. However, the added element may also be added as a separate attribute.

Therefore, by using the type of target services element, the receiver may identify the EPG Data Location, which provides EPG metadata on the COD service, and the receiver may use the type of target services element to access a required EPG Data Location, so as to receive only the EPG metadata. This is advantageous in that this method can be identically applied to any other services that are to be added in later processes, as well as to the COD service.

Figure 34:
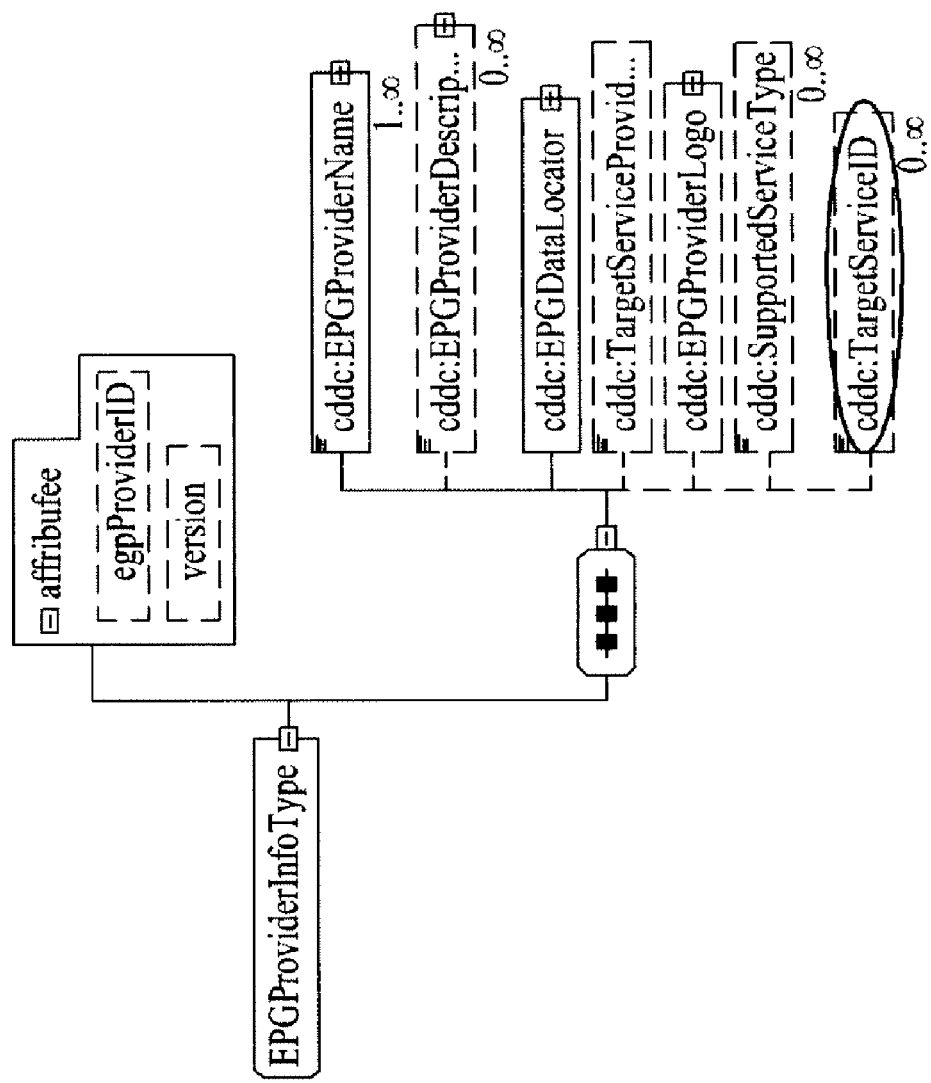
FIG. 34 illustrates an XML Schema on an element of an EPG Provider Information Type according to a second embodiment of the present invention.
Figure 36:
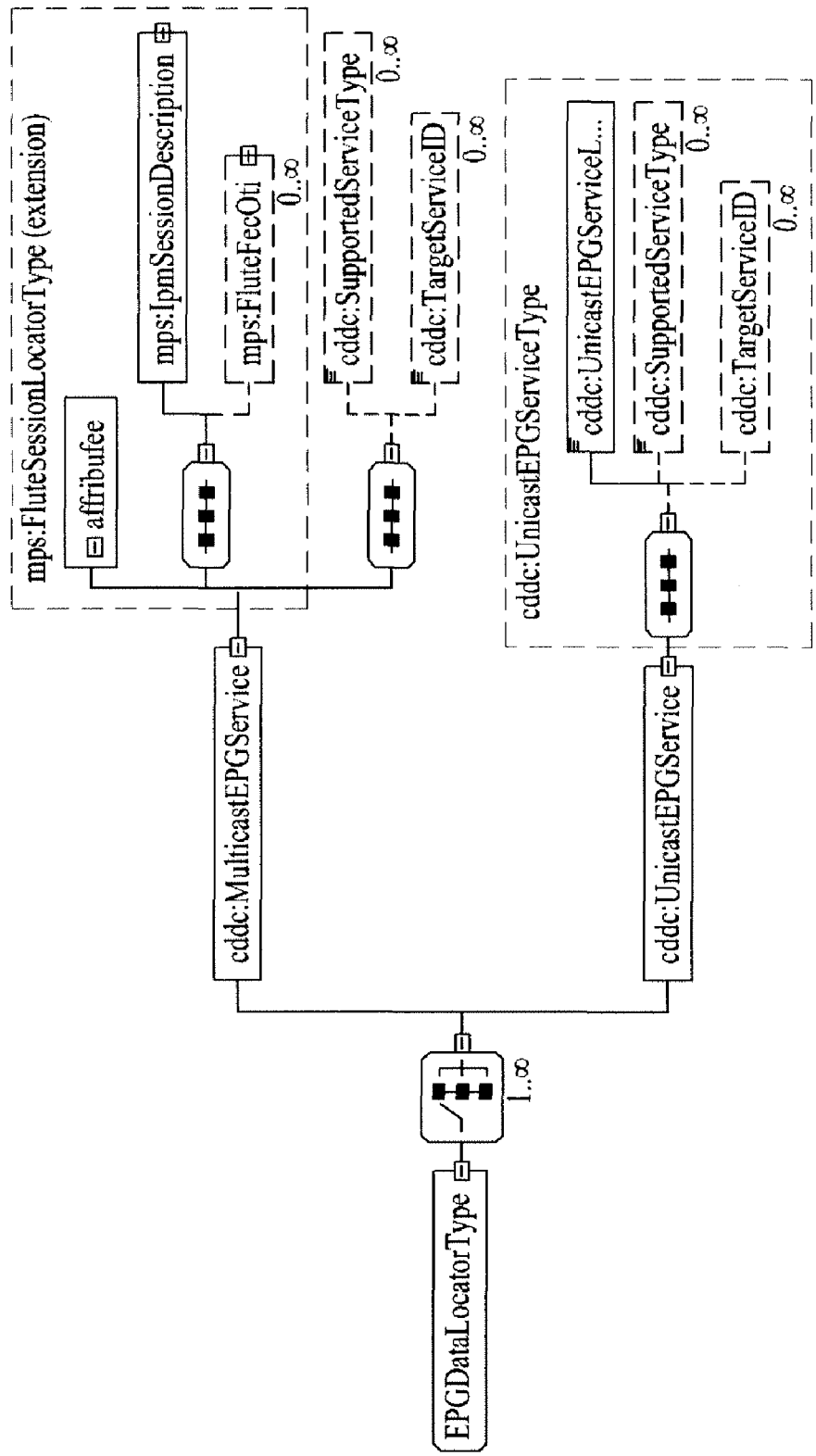
FIG. 36 illustrates a more detailed XML Schema on an element of an EPG Data Locator Type shown in FIG. 34.

FIG. 34 illustrates an XML Schema on an element of an EPG Provider Information Type according to a second embodiment of the present invention . . . . FIG. 35 illustrates a more detailed example of FIG. 34. FIG. 36 illustrates a more detailed XML Schema on an element of an EPG Data Locator Type shown in FIG. 34. FIG. 37 illustrates a more detailed example of FIG. 36.

Hereinafter, a detailed protocol for efficiently managing EPG information on the increasing COD service and linear TV service will no be described. However, the following description is merely exemplary, and, as a general rule, the scope and spirit of the present invention should be interpreted by the contents included in the scope of the claims of the present invention.

Unlike in the above-described first embodiment of the present invention, an element of the target service ID is added in the second embodiment of the present invention. The target service ID element gives (or provides) the identifier of a service that is covered by each of the EPG data provider's EPG data sources.

As shown in FIG. 34 and FIG. 35, in addition to the type of target services element (or Supported Service Type element), a Target Service ID element is added. Therefore, when the user wishes to selectively receive metadata on a subscribed service or a specific service given the access right, the EPG provider information of FIG. 34, which is newly defined in the present invention, may be used.

Further, a process of designating the metadata of a specific service provided by the EPG provider for each EPG Data Location may be considered. The schema of this case is illustrated in FIG. 36 and FIG. 37. As shown in FIG. 36 and FIG. 37, by extending both the Multicast EPG Service and the Unicast EPG Service, in addition to the type of target services element (or Supported Service Type element), a Target Service ID element is added.

Therefore, it is advantageous in that, by using the Target Service ID element, the supported service type and service ID may be specified for each EPG Data Location, and that, based upon the Target Service ID element, the user may select the EPG Data Location that is to be received.

Figure 38:
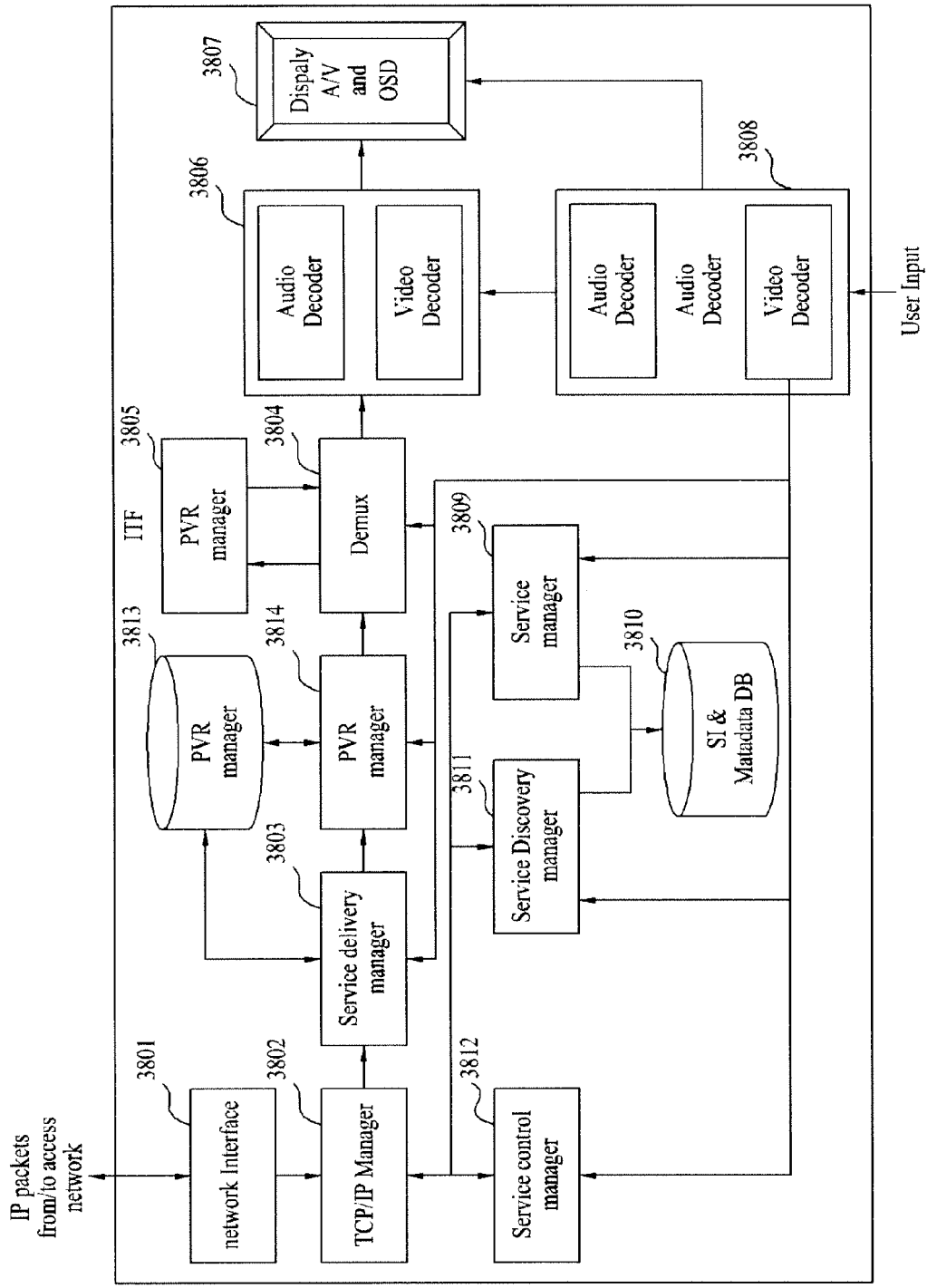
FIG. 38 illustrates block view showing a receiver according to an embodiment of the present invention.

FIG. 38 illustrates block view showing a receiver according to an embodiment of the present invention. Hereinafter, referring to FIG. 38, the block view showing the receiver according to an embodiment of the present invention will now be described in detail.

FIG. 38 illustrates a general IPTV receiver. Herein, ITF is an abbreviation of an Open IPTV Terminal Function, which may signify a receiver configured of function modules required for supporting IPTV service. However, the present invention may be applied to other devices in addition to the IPTV receiver.

A Network Interface (3801) performs receiving/sending of IPTV packets.

An IP Manager (Internet Protocol Manager) (3802) is responsible for end to end (source to destination) packet delivery. The IP Manager (3802) classifies each packet to the appropriate protocol manager.

A Service Delivery Manager (3803) is responsible for handling real-time streaming data and downloading content, and is also responsible for retrieving contents from the Content DB for later consumption. The RTP/RTCP (Real-Time Transport Protocol/RTP Control Protocol) may be used with an MPEG-2 TS. Herein, MPEG-2 packets are encapsulated in an RTP. The MPEG-2 transport packets may be carried directly in a UDP without the RTP. For content downloading, an HTTP or FLUTE protocol may be used for the delivery protocol.

A DEMUX (3804) performs de-multiplexing of audio, video and PSI tables from input transport packets, controls the de-multiplexing for PSI tables by a PSI Decoder, makes the sections of PSI tables, sends the sections to the PSI Decoder, and controls the de-multiplexing for A/V transport packets.

A PSI (& PSIP and/or DVB-SI) Decoder (3805) may include a PSI (and PSIP/DVB-SI) Control Module. The PSI (& PSIP and/or DVB-SI) Decoder (3805) sets PIDs for PSI tables and PSIP/DVB-SI tables to the DEMUX, and decodes the private sections of the PSI (and PSIP and/or DVB-SI) sent by the DEMUX. The decoding result is used to de-multiplex input transport packets (e.g. . . . , setting Audio and Video PID to the DEMUX) . . . .

An Audio and Video Decoder (3806) performs decoding audio and video elementary stream packets.

An A/V and OSD Displayer (3807) receives audio and video data from the A/V Decoder, controls video and audio data, displays them on the Screen and speaker, and controls OSD (On Screen Display) Graphic data.

A Native Application manager and UI (User Interface) Manager (3808) supports the Graphic User Interface on a TV Screen, receives a user key by a remote controller or a front panel, and manages the states of the whole (or entire) TV system.

A Service Manager (3809) controls all the other managers related to the services, such as the Service control manager, the Service delivery manager, the IG-OITF client, the Service Discovery manager, and the Metadata manager. The service Manager (3809) is responsible for serving IPTV services.

An SI & Metadata DB (3810) is a database for Service Discovery information and Metadata related to the services.

An SD (Service Discovery) Manager (3811) enables the discovery of IPTV services over bi-directional IP network, and provides all the information for selecting service.

A Service Control Manager (3812) is responsible for selecting and controlling services and managing sessions. The Service Control Manager (3812) is used for selecting live broadcasting service, using an IGMP or RTSP protocol, and is used for selecting VOD contents, using an RTSP protocol.

When using the IMS, an SIP protocol is used for initiating and managing sessions through an IMS Gateway. The RTSP protocol can be used in the controlling of the delivery of broadcast TV and audio as well as on-demand delivery. The RTSP protocol uses a persistent TCP connection and allows a trick mode control on real-time media streaming.

A Content DB (3813) is a database for Contents which may be delivered by a content download system, or which may be recorded from a live media TV.

A PVR manager (3814) is responsible for recording and playing live streaming contents. The PVR manager (3814) gathers all the necessary metadata of the recorded content and generates additional information for better user experience (e.g., thumbnail image, index, etc. . . . ).

Figure 39:
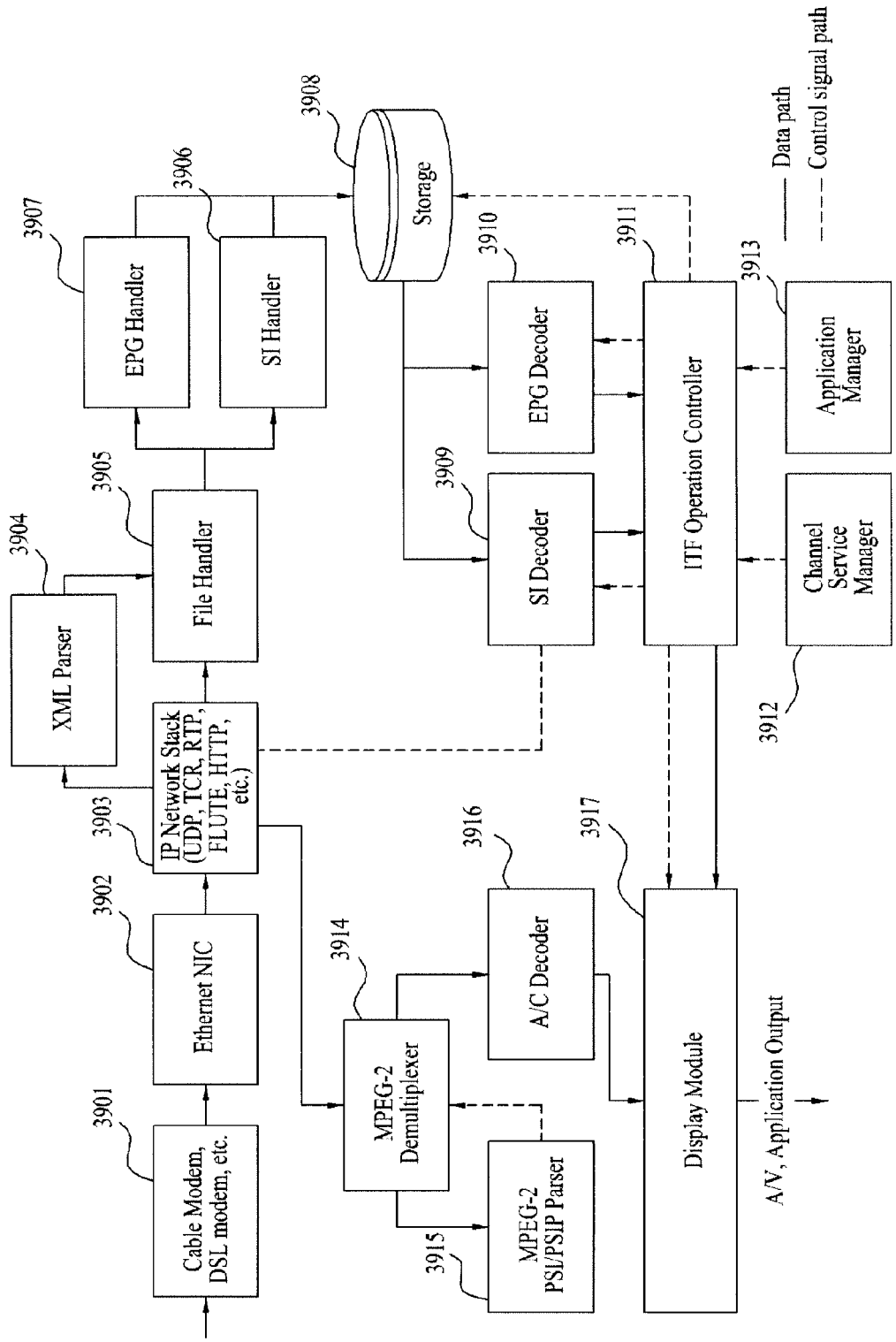
FIG. 39 illustrates block view showing a receiver according to another embodiment of the present invention.

FIG. 39 illustrates block view showing a receiver according to another embodiment of the present invention. Hereinafter, referring to FIG. 39, a block view showing the receiver according to another embodiment of the present invention will now be described in detail. In FIG. 39, the bold arrow corresponds to a data path, and the dotted arrow corresponds to a control signal path.

A Cable modem, DSL modem, etc. (3901) corresponds to an Interface through which the ITF is connected to an IP Network in a Physical level. Herein, the Cable modem, DSL modem, etc. (3901) Demodulates the signal transmitted through a Physical medium, so as to recover a Digital signal.

An Ethernet NIC (3902) is a module than can recover the signal transmitted through the Physical interface to IP data.

An IP Network Stack (3903) is a processing module of each layer according to an IP Protocol stack.

An XML Parser (3904) is a module parsing an XML Document among the received IP data.

A File Handler (3905) is a module processing data transmitted in a File format through the FLUTE, among the received IP data.

An SI Handler (3906) is a module processing a portion of the file format data corresponding to IPTV SI data and storing the processed data in a Storage . . . .

An EPG Handler (3907) is a module processing a portion of the file format data corresponding to IPTV EPG data and storing the processed data in the Storage.

A Storage (3908) is a storage unit storing data requiring storage, such as SI, EPG, etc.

When Channel Map information is required, an SI Decoder (3909) brings and analyzes SI data from the Storage, so as to recover the required information.

When EPG information is required, an EPG Decoder (3910) brings and analyzes EPG data from the Storage, so as to recover the required information . . . .

An ITF Operation Controller (3911) is a main controller controlling operations of an ITF, such as Channel shifting (or changing), EPG Display, and so on.

A Channel Service Manager (3912) is a module receiving an input from the user and controlling the operations of Channel shifting (or changing) . . . .

An Application Manager (3913) is a module receiving an input from the user and controlling Application services, such as EPG Display . . . .

An MPEG-2 Demultiplexer (3914) is a module extracting MPEG-2 Transport Stream data from a received IP Datagram and transmitting the extracted data to a respective module in accordance with each PID.

An MPEG-2 PSI/PSIP Parser (3915) is a module extracting and parsing PSI/PSIP data carrying information that can access a Program element, such as PID information of each data (A/V, etc.) of the MPEG-2 Transport Stream within the received IP Datagram.

An A/V Decoder (3916) is a module decoding the received Audio and Video data and delivering the decoded data to a Display module.

The Display Module (3917) is a module outputting the decoded A/V data or application.

FIG. 40 illustrates flow chart showing a controlling method according to an embodiment of the present invention. Although any one skilled in the art may fully understand the present invention through the description given in FIG. 1 to FIG. 39, the embodiment of the present invention will now be described more thoroughly in detail in order to provide a better and clearer understanding of the present invention.

First of all, a method of processing data on the EPG performed by a Service Provider connected to a network will now be described in detail.

The SP transmits provisioning information to a receiver (for example, ITF) during SP (Service Provider) attachment (S4000). However, the SP attachment may, for example, signify a process of the ITF accessing the SP in order to obtain EPG information (or data).

Further, according to the embodiment of the present invention, the provisioning information may be defined as follows.

The provisioning information has both first metadata on an EPG provider information giving locations where EPG data provided from an EPG data provider can be accessed and second metadata on an EPG data locator giving a location where the EPG data can be accessed in a pull mode or a push mode. Furthermore, the first metadata have both a target service ID element giving the identifier of a service, which is covered by each of the EPG data provider's EPG data sources, and a type of target services element giving a type of service, which is covered by each of the EPG data provider's EPG data sources. The target service ID element and the type of target services element added to the first metadata on the EPG provider information are shown in FIG. 34 and FIG. 35.

Additionally, the SP transmits service discovery metadata including at least two components to the receiver (for example, ITF) (S4002).

Also, according to another embodiment of the present invention, the second metadata on the EPG data locator have both a type of target services element giving a type of service, which is covered by the EPG data source, and a target service ID element giving the identification of a service, which is covered by the EPG data source. The target service ID element and the type of target services element added to the second metadata on the EPG data locator are shown in FIG. 36 and FIG. 37.

More specifically, according to the embodiment of the present invention, the target service ID element and the type of target services element may be additionally included in a level of the EPG provider information . . . . Also, according to the other embodiment of the present invention, the target service ID element and the type of target services element may be additionally included in a level of the EPG data locator. Therefore, the service type and ID may be identified in each level, thereby being capable of a swifter EPG provisioning and EPG provisioning for each service . . . .

Meanwhile, when an identical element is added in the EPG provider information level and in the EPG data locator level, an adjustment is required in the relation between the two levels. The present invention proposes a resolution for this instance.

For example, none of the target service ID elements that appear in the first metadata on EPG provider information applies to the EPG data source if the target service ID element appears in the second metadata on EPG data locator.

And, none of the type of target services elements that appear in the first metadata on EPG provider information applies to the EPG data source if the type of target services element appears in the second metadata on EPG data locator.

Furthermore, the type of service, which is covered by each of the EPG metadata provider's EPG data sources, corresponds to at least one of a linear TV service or a COD (Content On Demand) service.

The at least two of components are master SI tables corresponding to listings of virtual channel map tables, virtual channel map tables corresponding to listings of virtual channels, virtual channel description tables corresponding to descriptions of virtual channels, and source tables corresponding to acquisition information for virtual channels . . . .

The master SI table may contain pointers to the virtual channel maps, wherein the pointers are necessary for starting the virtual channel discovery process.

The source table may provide a single place (or position) for describing programming sources that are used by multiple services.

Secondly, a method of processing data on the EPG performed by a receiver (e.g., ITF) connected to a network will now be described in detail.

The receiver receives provisioning information from the SP during SP (Service Provider) attachment (S4001). However, the SP attachment may, for example, signify a process of the ITF accessing the SP in order to obtain EPG information (or data).

Further, according to the embodiment of the present invention, the provisioning information may be defined as follows.

The provisioning information has both first metadata on EPG provider information giving locations where EPG data provided from an EPG data provider can be accessed and second metadata on EPG data locator giving a location where EPG data can be accessed in a pull mode or a push mode. Furthermore, the first metadata have both a target service ID element giving the identifier of a service, which is covered by each of the EPG data provider's EPG data sources, and a type of target services element giving a type of service, which is covered by each of the EPG data provider's EPG data sources. The target service ID element and the type of target services element added to the first metadata on the EPG provider information are shown in FIG. 34 and FIG. 35.

Additionally, the receiver performs a services discovery procedure using service discovery metadata including at least two of the components supplied by the SP (S4003).

Also, according to another embodiment of the present invention, the second metadata on EPG data locator have both a type of target services element giving a type of service, which is covered by the EPG data source, and a target service ID element giving the identification of a service, which is covered by the EPG data source . . . . The target service ID element and the type of target services element added to the second metadata on the EPG data locator are shown in FIG. 36 and FIG. 37.

More specifically, according to the embodiment of the present invention, the target service ID element and the type of target services element may be additionally included in a level of the EPG provider information . . . . Also, according to the other embodiment of the present invention, the target service ID element and the type of target services element may be additionally included in a level of the EPG data locator. Therefore, the service type and ID may be identified in each level, thereby being capable of a swifter EPG provisioning and EPG provisioning for each service.

Meanwhile, when an identical element is added in the EPG provider information level and in the EPG data locator level, an adjustment is required in the relation between the two levels. The present invention proposes a resolution for this instance.

For example, none of the target service ID elements that appear in the first metadata on EPG provider information applies to the EPG data source if the target service ID element appears in the second metadata on EPG data locator.

And, none of the type of target services elements that appear in the first metadata on EPG provider information applies to the EPG data source if the type of target services element appears in the second metadata on EPG data locator.

Furthermore, the type of service, which is covered by each of the EPG metadata provider's EPG data sources, corresponds to at least one of a linear TV service or a COD (Content On Demand) service.

The at least two of components are master SI table corresponding to listings of virtual channel map tables, virtual channel map tables corresponding to listings of virtual channels, virtual channel description tables corresponding to descriptions of virtual channels and sources tables corresponding to acquisition information for virtual channels.

The master SI table may contain pointers to the virtual channel maps, wherein the pointers are necessary to start the virtual channel discovery process.

The source table may provide a single place (or position) for describing programming sources that are used by multiple services.

Finally, a module enabling the data on the receiver (e.g., ITF) connected to a network to process data on the EPG.

A network interface (3801), shown in FIG. 38, receives provisioning information from a service provider during SP (Service Provider) attachment. Furthermore, the provisioning information has both first metadata on EPG provider information giving locations where EPG data from an EPG data provider can be accessed and second metadata on EPG data locator giving a location where EPG data can be accessed in a pull mode or a push mode. Moreover, the first metadata have both a target service ID element giving the identifier of a service, which is covered by each of the EPG data provider's EPG data sources, and a type of target services element giving a type of service, which is covered by each of the EPG data provider's EPG data sources.

Furthermore, the service discovery manager (3811), shown in FIG. 38, performs a services discovery procedure using service discovery metadata including at least two components supplied by the service provider.

Meanwhile, although the description has been made for each drawing, in some cases, the characteristics of the present invention shown in each drawing may be combined so as to implement another invention. Furthermore, the description of the method invention and the description of the device invention may be interpreted by supplementing one another.

The method invention according to the present invention may be implemented in program command formats that can all be executed by a variety of computer means, thereby being recorded (or written) in a computer-readable medium. The computer-readable medium may include a program command, a data file, a data structure, and so on, either individually or in combination. The program command being written in the medium may either be specifically designed and configured for the present invention or may be disclosed to anyone skilled in the field of computer software, so as to be used. Examples of the computer-readable medium may include magnetic media such as a hard disk, a floppy disk, and a magnetic tape, optical media such as a CD-ROM and DVD, magneto-optical media such as a floptical disk, and hardware specifically designed for storing and executing program commands such as ROM, RAM, and flash memories. Examples of the program command may include machine language code that is created by a compiler, as well as a high-level language code that can be executed by using an interpreter. The above-described hardware device may be configured to be operated as at least one or more software modules for performing the operations of the present invention, and such configuration may also be inverted. As described above, although the present invention has been described with reference to limited embodiments and drawings, it will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

MODE FOR CARRYING OUT THE PRESENT INVENTION

As described above, the related details have been described in the best mode for carrying out the present invention.

INDUSTRIAL APPLICABILITY

As described above, the present invention may be applied entirely or partially to a digital broadcasting system.

What is claimed is:

1. A method of processing data on EPG (Electronic Program Guide) in a service provider connected to a network, the method comprising:

transmitting provisioning information to a receiver during SP (Service Provider) attachment, wherein the provisioning information has both first metadata on EPG provider information giving locations where EPG data from an EPG data provider can be accessed and second metadata on EPG data locator giving a location where EPG data can be accessed in a pull mode or a push mode, the first metadata having both a target service ID element giving the identifier of a service, which is covered by each of the EPG data provider's EPG data sources, and a type of target services element giving a type of service, which is covered by each of the EPG data provider's EPG data sources; and transmitting service discovery metadata including at least two components to the receiver.

2. The method of claim 1, wherein the second metadata have both a type of target services element giving a type of service, which is covered by the EPG data source, and a target service ID element giving the identification of a service, which is covered by the EPG data source.

3. The method of claim 1, wherein the at least two components are a master SI table corresponding to listings of virtual channel map tables, virtual channel map tables corresponding to listings of virtual channels, virtual channel description tables corresponding to descriptions of virtual channels, and source tables corresponding to acquisition information for virtual channels.

4. The method of claim 2, wherein none of the target service ID elements that appear in the first metadata on EPG provider information applies to the EPG data source if the target service ID element appears in the second metadata on EPG data locator.

5. The method of claim 4, wherein none of the type of target services elements that appear in the first metadata on EPG provider information applies to the EPG data source if the type of target services element appears in the second metadata on EPG data locator.

6. The method of claim 1, wherein the type of service, which is covered by each of the EPG metadata provider's EPG data sources, corresponds to at least one of a linear TV service or a COD (Content On Demand) service.

7. The method of claim 3, wherein the master SI table contains pointers to the virtual channel maps, the pointers being necessary to start the virtual channel discovery process.

8. The method of claim 1, further comprising: a source table that provides a single place for describing programming sources that are used by multiple services.

9. A method of processing data on EPG (Electronic Program Guide) in a receiver connected to a network, the method comprising:

receiving provisioning information from a service provider during SP (Service Provider) attachment, wherein the provisioning information has both first metadata on EPG provider information giving locations where EPG data from an EPG data provider can be accessed and second metadata on EPG data locator giving a location where EPG data can be accessed in a pull mode or a push mode, the first metadata having both a target service ID element giving the identifier of a service, which is covered by each of the EPG data provider's EPG data sources, and a type of target services element giving a type of service, which is covered by each of the EPG data provider's EPG data sources; and performing a services discovery procedure using service discovery metadata including at least two components supplied by the service provider.

10. The method of claim 9, wherein the second metadata have both a type of target services element giving a type of service, which is covered by the EPG data source, and a target service ID element giving the identification of a service, which is covered by the EPG data source.

11. The method of claim 9, wherein the at least two components are master SI table corresponding to listings of virtual channel map tables, virtual channel map tables corresponding to listings of virtual channels, virtual channel description tables corresponding to descriptions of virtual channels, and source tables corresponding to acquisition information for virtual channels.

12. The method of claim 10, wherein none of the target service ID elements that appear in the first metadata on EPG provider information applies to the EPG data source if the target service ID element appears in the second metadata on EPG data locator.

13. The method of claim 12, wherein none of the type of target services elements that appear in the first metadata on EPG provider information applies to the EPG data source if the type of target services element appears in the second metadata on EPG data locator.

14. The method of claim 9, wherein the type of service, which is covered by each of the EPG metadata provider's EPG data sources, corresponds to at least one of a linear TV service or a COD (Content On Demand) service.

15. The method of claim 11, wherein the master SI table contains pointers to the virtual channel maps, the pointers being necessary to start the virtual channel discovery process.

16. The method of claim 9, further comprising: a source table that provides a single place for describing programming sources that are used by multiple services.

17. A digital broadcast receiver of processing data on EPG (Electronic Program Guide), the digital broadcast receiver comprising:

a network interface configured to receive provisioning information from a service provider during SP (Service Provider) attachment, wherein the provisioning information has both first metadata on EPG provider information giving locations where EPG data from an EPG data provider can be accessed and second metadata on EPG data locator giving a location where EPG data can be accessed in a pull mode or a push mode, the first metadata having both a target service ID element giving the identifier of a service, which is covered by each of the EPG data provider's EPG data sources, and a type of target services element giving a type of service, which is covered by each of the EPG data provider's EPG data sources; and a controller configured to perform a services discovery procedure using service discovery metadata including at least two components supplied by the service provider.

18. The digital broadcast receiver of claim 17, wherein the second metadata have both a type of target services element giving a type of service, which is covered by the EPG data source, and a target service ID element giving the identification of a service, which is covered by the EPG data source.

19. The digital broadcast receiver of claim 18, wherein none of the target service ID elements that appear in the first metadata on EPG provider information applies to the EPG data source if the target service ID element appears in the second metadata on EPG data locator.

20. The digital broadcast receiver of claim 19, wherein none of the type of target services elements that appear in the first metadata on EPG provider information applies to the EPG data source if the type of target services element appears in the second metadata on EPG data locator.

* * * * *